(12) United States Patent
Melson

(10) Patent No.: US 9,854,397 B1
(45) Date of Patent: Dec. 26, 2017

(54) SYSTEMS AND USER INTERFACES FOR DYNAMIC AND INTERACTIVE PERSON AND EVENT DATA ACCESS AND ANALYSIS

(71) Applicant: Hawk Analytics, Inc., Temecula, CA (US)

(72) Inventor: Michael Roy Melson, Temecula, CA (US)

(73) Assignee: HAWK ANALYTICS, INC., Bartonville, TX (US)

( * ) Notice: Subject to any disclaimer, the term of this patent is extended or adjusted under 35 U.S.C. 154(b) by 18 days.

(21) Appl. No.: 15/040,263

(22) Filed: Feb. 10, 2016

Related U.S. Application Data

(60) Provisional application No. 62/154,345, filed on Apr. 29, 2015.

(51) Int. Cl.
    *H04W 4/02*    (2009.01)
    *G06Q 50/26*   (2012.01)

(52) U.S. Cl.
    CPC .......... *H04W 4/021* (2013.01); *G06Q 50/265* (2013.01)

(58) Field of Classification Search
    None
    See application file for complete search history.

(56) References Cited

U.S. PATENT DOCUMENTS

| | | | |
|---|---|---|---|
| 5,293,642 A | 3/1994 | Lo | |
| 5,548,583 A | 8/1996 | Bustamante | |
| 5,625,668 A | 4/1997 | Loomis | |
| 6,031,454 A | 2/2000 | Lovejoy | |
| 6,072,396 A | 6/2000 | Gaukel | |
| 6,100,806 A | 8/2000 | Gaukel | |
| 6,272,342 B1 | 8/2001 | Havinis | |
| 6,285,875 B1 * | 9/2001 | Alajoki | H04W 24/00 455/405 |
| 6,405,213 B1 | 6/2002 | Layson | |
| 6,463,288 B1 | 10/2002 | Havinis | |

(Continued)

OTHER PUBLICATIONS

Hawk Analytics—Location Analysis for Law Enforcement. Webpage print out in 11 pages. <http://www.hawkanalytics.com> & <http://www.hawkanalytics.com/products/> Retrieved from the Internet Archive and dated Mar. 11, 2014.

*Primary Examiner* — Moustapha Diaby
(74) *Attorney, Agent, or Firm* — Knobbe Martens Olson & Bear LLP

(57) ABSTRACT

An interactive information map system is disclosed that enables a user to efficiently search through, and determine matches within, large amounts of data including event-location data and person-location data. The interactive information map system may include an interactive user interface in which event-location data, person-location data, and/or matches between event-location data and person-location data may be displayed on a map. Further, a user of the interactive information map system may input search queries to the interactive information map system, including selections of subsets of event-location data and person-location data, for determining matches. The user may limit the search query based on a time or timeframe of interest. Advantageously, according to various embodiments, the interactive information map system may enable a user to identify matches between records of events occurring at particular locations and records of persons being at particular locations.

17 Claims, 28 Drawing Sheets

(56) References Cited

U.S. PATENT DOCUMENTS

| | | |
|---|---|---|
| 2002/0003470 A1 | 1/2002 | Auerbach |
| 2004/0225681 A1* | 11/2004 | Chaney ............. G06F 17/30017 |
| 2010/0315235 A1 | 12/2010 | Adegoke |
| 2013/0163742 A1* | 6/2013 | Lim ........................ H04M 3/44 |
| | | 379/216.01 |
| 2013/0166352 A1* | 6/2013 | Scarr ....................... H04L 67/22 |
| | | 705/7.33 |
| 2014/0189760 A1* | 7/2014 | Payette .............. H04N 21/2381 |
| | | 725/86 |
| 2014/0361899 A1* | 12/2014 | Layson .................. G08B 21/18 |
| | | 340/573.4 |
| 2015/0170060 A1* | 6/2015 | Blechner ................ G06Q 10/02 |
| | | 705/5 |

\* cited by examiner

| Identifier | Location | Start Time | End Time |
|---|---|---|---|
| 14056965 | 123 Main, Springfield, CA | 2014-10-12 16:30 | 2014-10-13 1:40 |
| 14057849 | 65 Broadway, Springfield, CA | 2014-11-15 10:30 | 2014-11-15 13:30 |
| 14072676 | 38.035828, -120.398483 | 2014-11-16 1:20 | 2014-11-19 4:50 |
| 14082654 | 38.046069, -120.419726 | 2014-11-24 22:10 | 2014-11-25 5:30 |
| ... | ... | ... | ... |

FIG. 3A

SYSTEMS AND USER INTERFACES FOR DYNAMIC AND INTERACTIVE PERSON AND EVENT DATA ACCESS AND ANALYSIS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims priority benefit of U.S. Provisional Patent Application 62/154,345, filed Apr. 29, 2015, and titled "SYSTEMS AND USER INTERFACES FOR DYNAMIC AND INTERACTIVE PERSON AND EVENT DATA ACCESS AND ANALYSIS." The entire disclosure of each of the above items is hereby made part of this specification as if set forth fully herein and incorporated by reference for all purposes, for all that it contains.

TECHNICAL FIELD

Embodiments of present disclosure relate to systems and techniques for accessing one or more databases to provide information in an interactive user interface. More specifically, embodiments of the present disclosure relate to systems and user interfaces displaying matching person record data and event record data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Geographical map applications (e.g., Geographical Information Systems (GIS)) generally have graphical user interfaces that include map images (e.g., satellite images) overlaid by various objects and geographical data (e.g., data representing roads, buildings, etc.). A user of such an application may be able to input a search query to find, e.g., a particular road or address, or directions from one location to another.

SUMMARY

The systems, methods, and devices described herein each have several aspects, no single one of which is solely responsible for its desirable attributes. Without limiting the scope of this disclosure, several non-limiting features will now be described briefly.

In various embodiments, an interactive information map system (also referred to herein as "the system") is disclosed that enables a user to efficiently search through, and determine matches within, large amounts of data including event-location data and person-location data. The interactive information map system may include an interactive user interface in which event-location data, person-location data, and/or matches between event-location data and person-location data may be displayed on a map. Further, a user of the interactive information map system may input search queries to the interactive information map system, including selections of subsets of event-location data and person-location data, for determining matches. The user may limit the search query based on a time or timeframe of interest.

Advantageously, according to various embodiments, the interactive information map system may enable a user to identify matches between records of events occurring at particular locations and records of persons being at particular locations. Thus, for example, in a law enforcement context, call record data (indicating person-locations) may be combined with cold case data (including event-locations) to determine leads for solving the cold cases (e.g., law enforcement cases that have gone unsolved for a long period of time).

Further, as described herein, various embodiments of the system may be configured and/or designed to generate user interface data useable for rendering the various interactive user interfaces described. The user interface data may be used by the system, and/or another computing system, device, and/or software program (for example, a browser program), to render the interactive user interfaces. The interactive user interfaces may be displayed on, for example, electronic displays (including, for example, touch-enabled displays).

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface including interactions with mapped person-location data and/or event-location data, among other interactions described herein, may provide optimized interactions in comparison to previous systems.

Further, the interactive and dynamic user interfaces described herein are enabled by innovations in efficient interactions between the user interfaces and underlying systems and components. For example, disclosed herein are improved methods of receiving user inputs (including methods of querying data and identifying matching person-location data and event-location data), translation and delivery of those inputs to various system components, automatic and dynamic execution of complex processes in response to the input delivery, automatic interaction among various components and processes of the system, and automatic and dynamic updating of the user interfaces (to, for example, display matches and other information). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing geographical map application technology, as described above, is limited in various ways (e.g., person-location data and event-location data may not be presented efficiently or at all, matches between such data cannot be identified efficiently or at all, etc.), and various embodiments of the disclosure provide significant improvements over such technology. Additionally, various embodiments of the present disclosure are inextricably tied to computer technology. In particular, various embodiments rely on aggregation of electronic person-location data (e.g., call record data), plotting and comparison of electronic person-location data and event-location data, display of such data in interactive graphical user interfaces displayed on electronic displays, etc. Such features are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 3A illustrates an example of event-location data that may be imported into the interactive information map system, according to an embodiment of the present disclosure.

DETAILED DESCRIPTION

Figure 1:
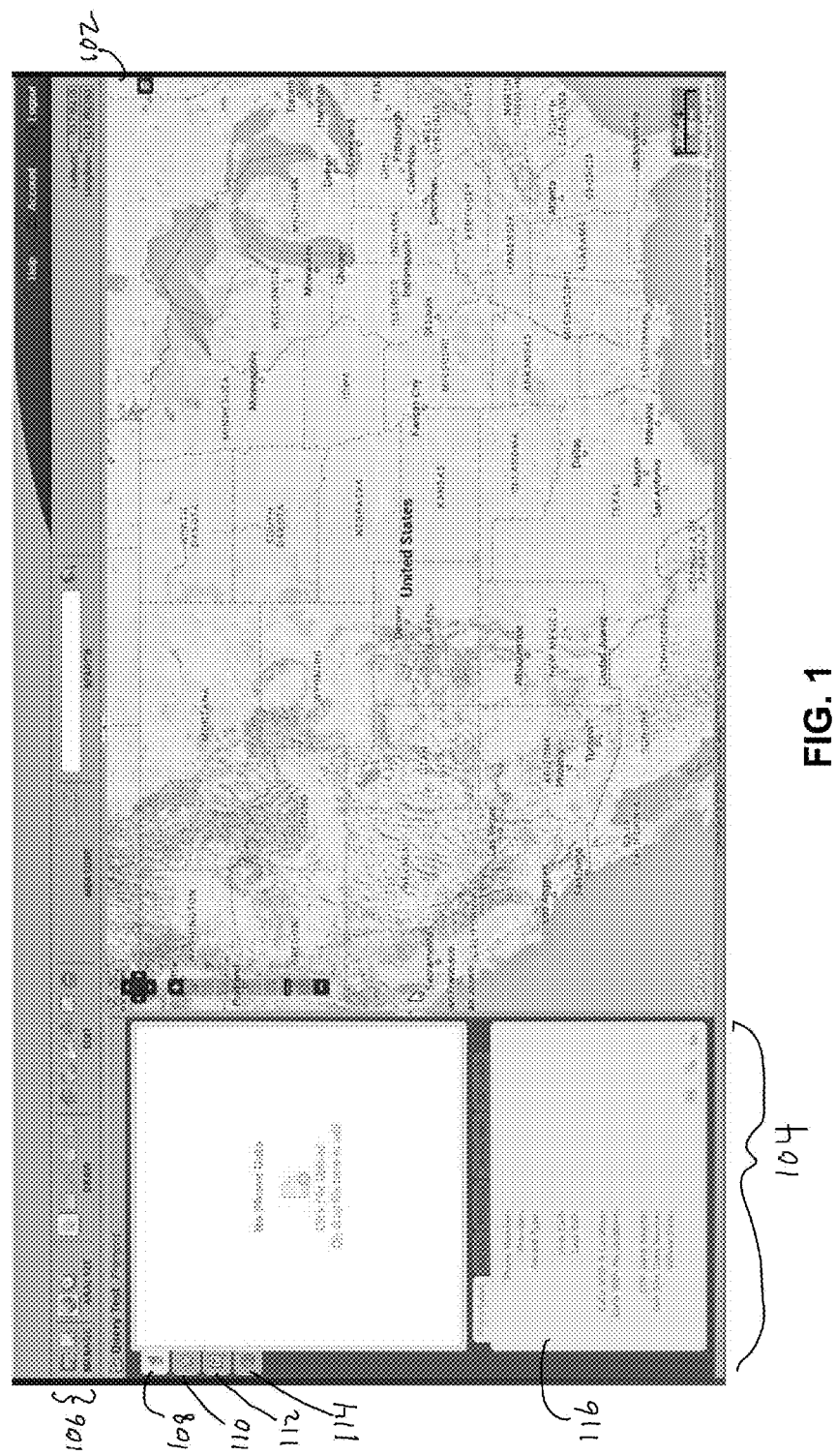
FIG. 1 illustrates an example graphical user interface of an interactive information map system, according to an embodiment of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

As mentioned above, according to various embodiments an interactive information map system (also referred to herein as "the system") is disclosed that enables a user to more quickly, thoroughly, and efficiently interact with person-location data and event-location data, provide search queries of the data, and identify matches of interest from search results. This and other functionality and advantages are provided, according to various embodiments, via interactive graphical user interfaces, including interactive map interfaces, which are inextricably tied to computer technology.

As also mentioned above, the system enables a user to efficiently search through, and determine matches within, large amounts of data including event-location data and person-location data. The interactive information map system may include an interactive user interface in which event-location data, person-location data, and/or matches between event-location data and person-location data may be displayed on a map. Further, a user of the interactive information map system may input search queries to the interactive information map system, including selections of subsets of event-location data and person-location data, for determining matches. The user may limit the search query based on a time or timeframe of interest. Advantageously, according to various embodiments, the interactive information map system may enable a user to identify matches between records of event occurring at particular locations and records of persons being at particular locations. Thus, for example, in a law enforcement context, call record data (indicating person-locations) may be combined with cold case data (including event-locations) to determine leads for solving the cold cases (e.g., law enforcement cases and/or crimes that have gone unsolved for a long period of time). For example, the system may determine that events associated with an unsolved crime (e.g., a bank in location 1 was robbed at time 1) match certain call records of a person (e.g., person 1 made a call from location 1 at time 1).

In some embodiments, the system may generate alerts that may be automatically transmitted to a mobile device of the user, and may activate an application on the mobile device of the user, to provide timely notifications to the user, for example, of matches and/or updated event-location data and/or person-location data.

While the system is described below in a law enforcement context to identify persons potentially associated with cold cases, the system may be used in other contexts and with other data also. For example, the system may be used in contexts such as military, government, private business, and/or the like, to import data, to match up events and persons, and/or the like.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Database: A broad term that includes, but is not limited to only, a data structure identified as a database, for example, RDBMS, or SQL, or NoSQL databases. Rather, a "database" may refer to any other data store or data structure such as, for example, comma separated values (CSV) files, eXtendible markup language (XML) files, TeXT (TXT) files, flat files, spreadsheet files, and/or any other widely used or proprietary format.

Event-Location Data: Any type of data and/or information related to events. Also referred to herein as event-location data items. An event-location data item generally includes at least a location and a time associated with an event. An event-location data item generally also includes a unique identifier. The location may be specified by, e.g., an address, latitude and longitude, Global Positioning System (GPS) coordinates, other global coordinates, other location formats, and/or the like. The location may be highly specific (e.g., a particular address and/or narrowly defined GPS coordinates) such that a small geographic area is encompassed by the location, or more general (e.g., a street and/or broadly defined GPS coordinates) such that a larger geographic area is encompassed by the location. The time may be a specified in any format (e.g., UTC, GMT, etc.), and may include a single time, a time range, or multiple times and/or time ranges. As with the location, the time may be highly specific (e.g., within a particular minute) or more general (e.g., within an hour, day, week, etc.). Thus, examples of event-location data items include the following, where each example event-location data item is enclosed by parentheses: (identifier: 84357; location: 123 Main, Springfield, Calif.; time: 2014-10-12 16:30), (identifier: 347628736; location: Springfield, Calif.; start time: 2014-10-12 16:30; end time: 2014-10-13 1:40), (identifier: event_one; location: 38.035828, −120.398483; time: 2014-10-12). As described, different event-location data items may include different types of information, e.g., some may include start and end times, other may only include a single time, etc. In some instances event-location data may include other information, e.g., a description of the event. Any combination of different types of event-location data items may be used in the system simultaneously. Event-location data items may be from various sources, and may be associated with various types of events. For example, event-location data may include event-location data items associated with law enforcement cases (including cold cases) (e.g., robbery events, assault events, etc.). Example sources of event-location data include, but are not limited to, law enforcement data sources. Event-location data may be obtained from a single database or multiple databases. The single and/or multiple databases from which event-location data may be obtained may be operated, maintained, and/or owned by various entities.

Person-Location Data: Any type of data and/or information related to persons. Also referred to herein as person-location data items. A person-location data item generally includes at least a location and a time associated with an event (e.g., a phone call, a cell town ping, etc.). A person-location data item generally also includes a unique identifier. Similar to the location associated with event-location data items described above, the location associated with a person location data item location may be specified by, e.g., a cell phone tower identifier, a cell phone town location, a region of an identified cell phone tower, a location of a cell phone (including a smartphone), an address, latitude and longitude, Global Positioning System (GPS) coordinates, other global coordinates, other location formats, and/or the like. The location may be highly specific (e.g., a particular cell phone tower, a distance from a particular cell phone tower, a particular address, and/or narrowly defined GPS coordinates) such that a small geographic area is encompassed by the location, or more general (e.g., two or more associated cell phone towers, a street and/or broadly defined GPS coordinates) such that a larger geographic area is encompassed by the location. The time may be a specified in any format (e.g., UTC, GMT, etc.), and may include a single time, a time range, or multiple times and/or time ranges. As with the location, the time may be highly specific (e.g., within a particular minute) or more general (e.g., within an hour, day, week, etc.). Thus, examples of person-location data items include the following, where each example person-location data item is enclosed by parentheses: (identifier: person1; location: cell phone tower 83482; time: 2014-10-12 16:30), (identifier: 478772; location: within 0.5 miles of cell phone tower 489302; start time: 2014-10-12 16:30; end time: 2014-10-13 1:40), (identifier: person3; location: 38.035828, −120.398483; time: 2014-10-12). As described, different person-location data items may include different types of information, e.g., some may include start and end times, other may only include a single time, etc. In some instances person-location data may include other information, e.g., a description of an associated cell phone tower, etc. Any combination of different types of event-location data items may be used in the system simultaneously. Person-location data items may be from various sources. Example sources of person-location data include, but are not limited to, Cell Phone Call Detail Records (CDR) (that include, e.g., a call time and location of related cell phone antennas and/or towers used), Cell Phone Location Detail Records (LDR) (that include, e.g., a time and estimated location of a phone), other types of call records or cell phone location records, GPS Tracker information, any other time-stamped location information associated with a person, and/or the like. Person-location data may be obtained from a single database or multiple databases. The single and/or multiple databases from which person-location data may be obtained may be operated, maintained, and/or owned by various entities.

DESCRIPTION OF THE FIGURES

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIG. 1 illustrates an example graphical user interface of the interactive information map system, according to an embodiment of the present disclosure. The user interface may include a map interface 102, a sidebar 104, and various input buttons 106. As shown, the sidebar 104 may include various user-selectable tabs (such as tabs 108, 110, 112, and 114). Selection of the various tabs enable a user to provide different types of inputs, and/or interact with data in the system. For example, selection of tab 108 enables the user to import, select, and/or otherwise interact with person-location data, such as Cell Phone Call Detail Records (CDR) and/or Cell Phone Location Detail Records (LDR). Selection of tab 110 enables the user to import, select, and/or otherwise interact with event-location data. Selection of tab 112 enables the user to input, select, view results of, and/or otherwise interact search queries. Selection of tab 114 enables the user to import, select, and/or otherwise interact with cell phone tower record data. In some instances, the sidebar 104 includes data item details in box 116. Various data items, including person-location data items, event-location data items, cell tower record data items, and search query results, may be represented on the map interface 102 with icons and/or symbols. In various embodiments, functionality of the interactive information map system (as described in reference to the various figures below) may be implemented in one or more computer modules and/or processors, as is described below with reference to FIGS. 8A-8C.

In various embodiments, the user interface of FIG. 1 is displayed on an electronic display viewable by a user of the interactive information map system. The user of the interactive information map system may interact with the user interface of FIG. 1 by, for example, touching the display when the display is touch-enabled, using a mouse pointer to click on the various elements of the user interface, and/or using a keyboard to input data.

The user of the system may interact with the user interface (as shown in FIG. 1) by scrolling or panning up, down, and/or side to side; zooming in or out; selecting data items; drawing shapes; performing a search queries; and/or the like. Various user actions may reveal more or less map detail, and/or more or fewer data items.

FIGS. 2A-2D illustrate example user interfaces of the interactive information map system in which various types of data are displayed, according to embodiments of the present disclosure.

Figure 2A:
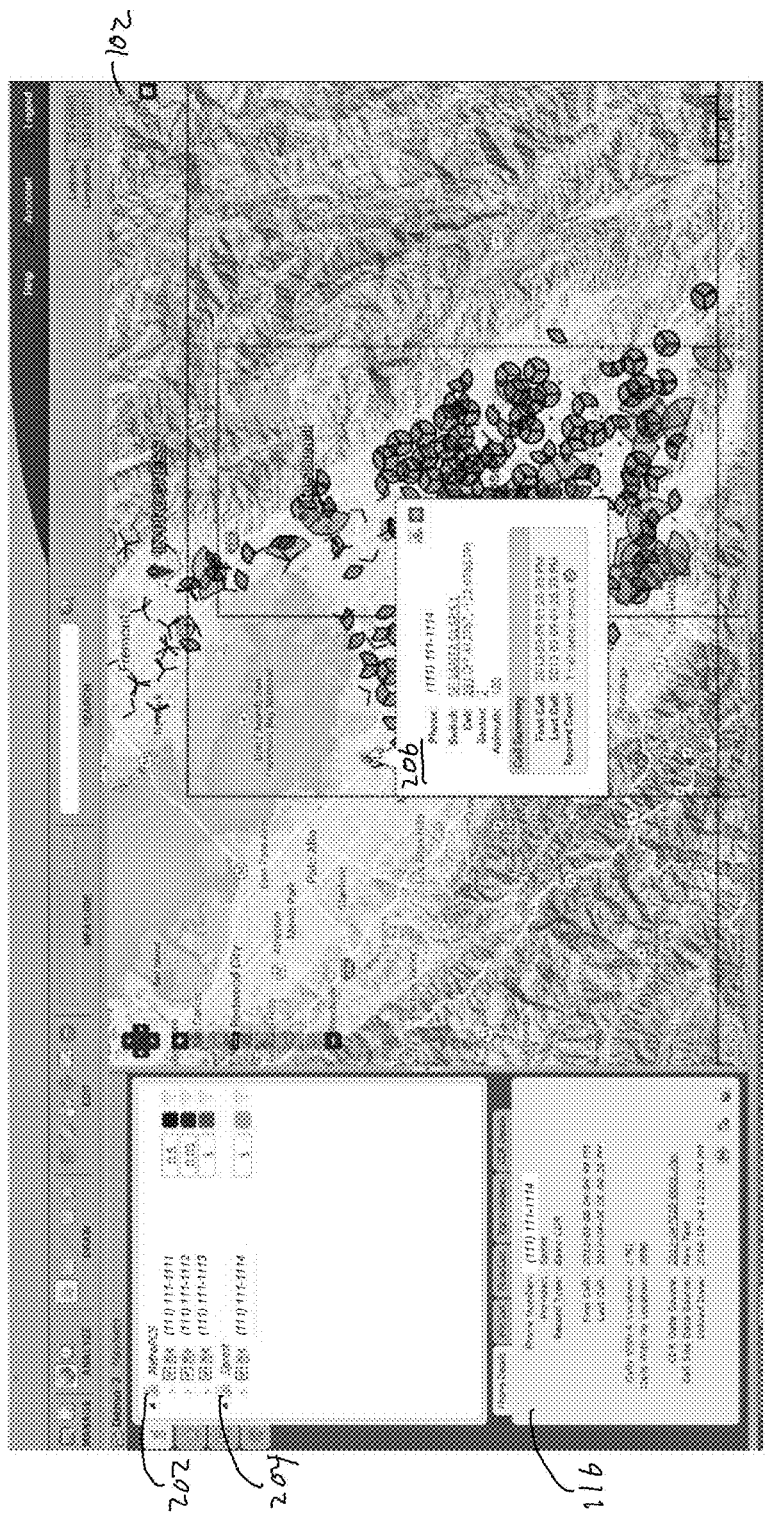
FIGS. 2A-2D illustrate example user interfaces of the interactive information map system in which various types of data are displayed, according to embodiments of the present disclosure.

Referring to FIG. 2A, two sets of person-location data have been imported into the system, person-location data set 202 and person-location data set 204. Person-location data set 202 includes, e.g., call records associated with three phone numbers. Each of the displayed phone numbers may be associated with multiple person-location data items, and thus multiple locations. The user may select one or more of the phone numbers displayed to cause the system to display, in the map interface 102, locations (from the person-location data items) associated with those selected phone numbers. As shown in the map interface 102, various person-location data items are represented by pie-type icons. Each pie-type icon represents a cell phone tower associated with a person-location data item. Slices of the pie-type icons indicate regions of the area covered by respective cell phone towers with which person-location data items are associated. The user may select, via the map interface 102, a person-location data item to view details, as shown in popup 206. Additionally, the user may view details associated with a person-location data set, a phone number, and/or a person-location data item, in box 116.

Figure 2B:
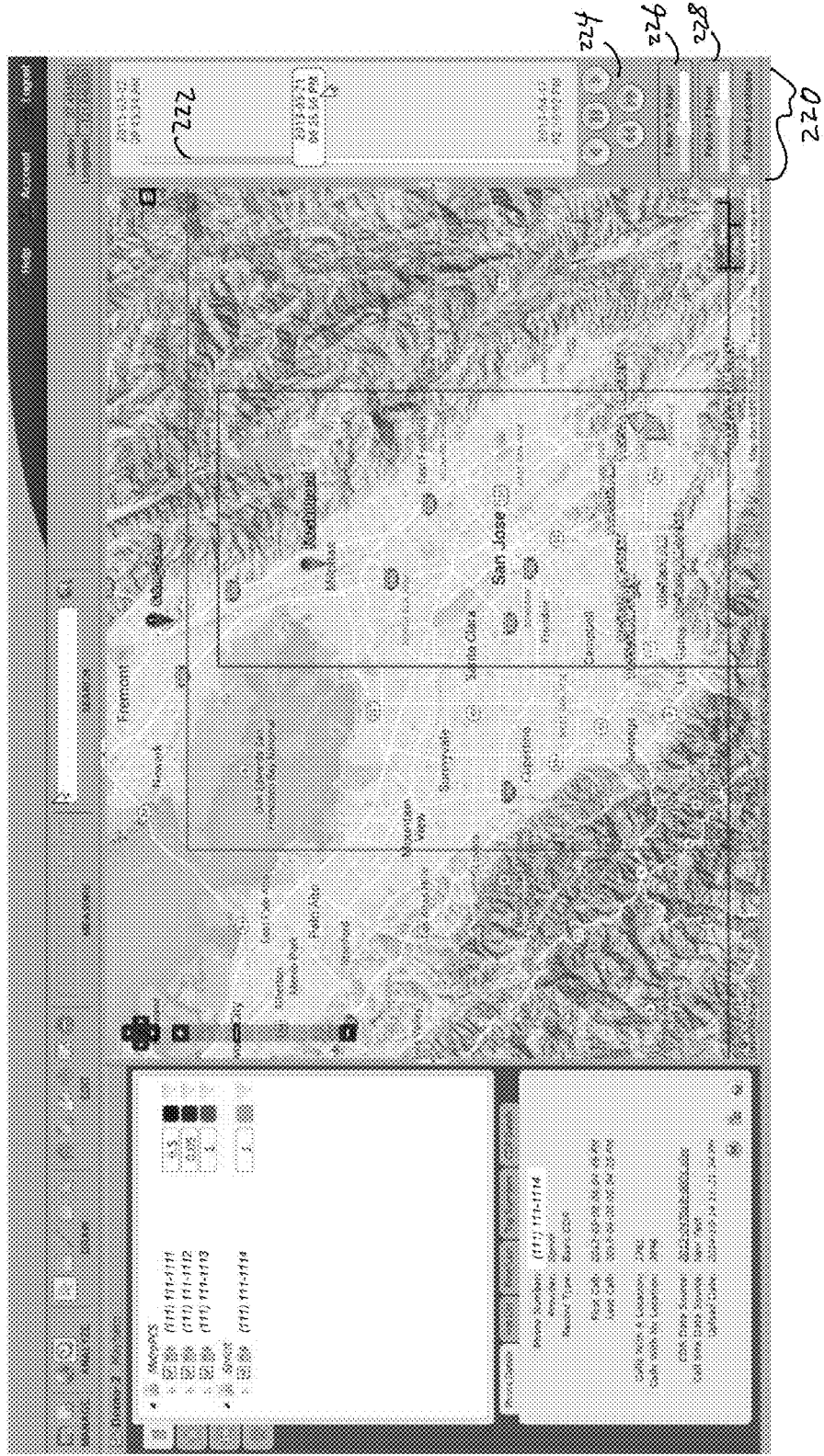

Referring to FIG. 2B, the person-location data may be displayed by the system in an animated fashion in the map interface 102 to enable the user to more easily visualize actions and/or movement of a person. This may be accomplished, in an embodiment, by activation of an animation sidebar 220. The animation sidebar 220 may include a slider 222, by which the user may select a particular time. Person-location data items associated with the selected time, or within a range of the selected time, are automatically displayed in the map interface 102 via icons as described above. The user may select to animate the display of the person-location data items via the controls 224. For example, the user may select a "play" button to cause the time to automatically advance at a particular rate (as indicated by selector 226), and person-location data items to be displayed in the map interface 102 by appearing and disappearing according to their respective associated times. The user may control how person-location data items appear and disappear by adjusting a fade control 228, such that displayed person-location data items fade in and out within a time frame indicated.

Figure 2C:
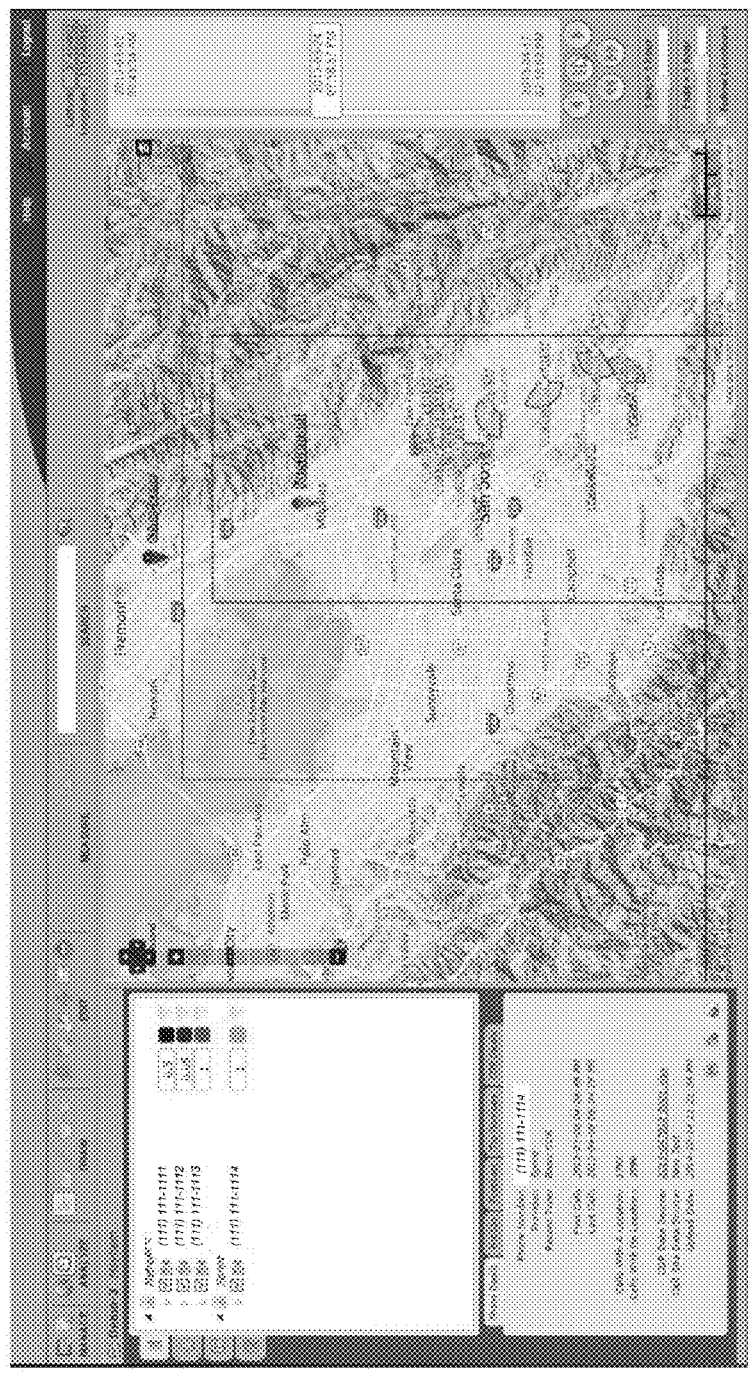

FIG. 2C illustrates an update of the map interface 102 as the slider 222 is moved from the time shown in FIG. 2B, to the time shown in FIG. 2C (either by manual movement of the slider 222 by the user or by selection of the "play" button). As shown, different person-location data items are shown in the map interface 102. In an embodiment, start and end times associated with the slider 222 are automatically determined by the earliest and latest times associated with selected person-location data items. In an embodiment, only selected person-location data items are animated as the user interacts with the animation sidebar 220.

Figure 2D:
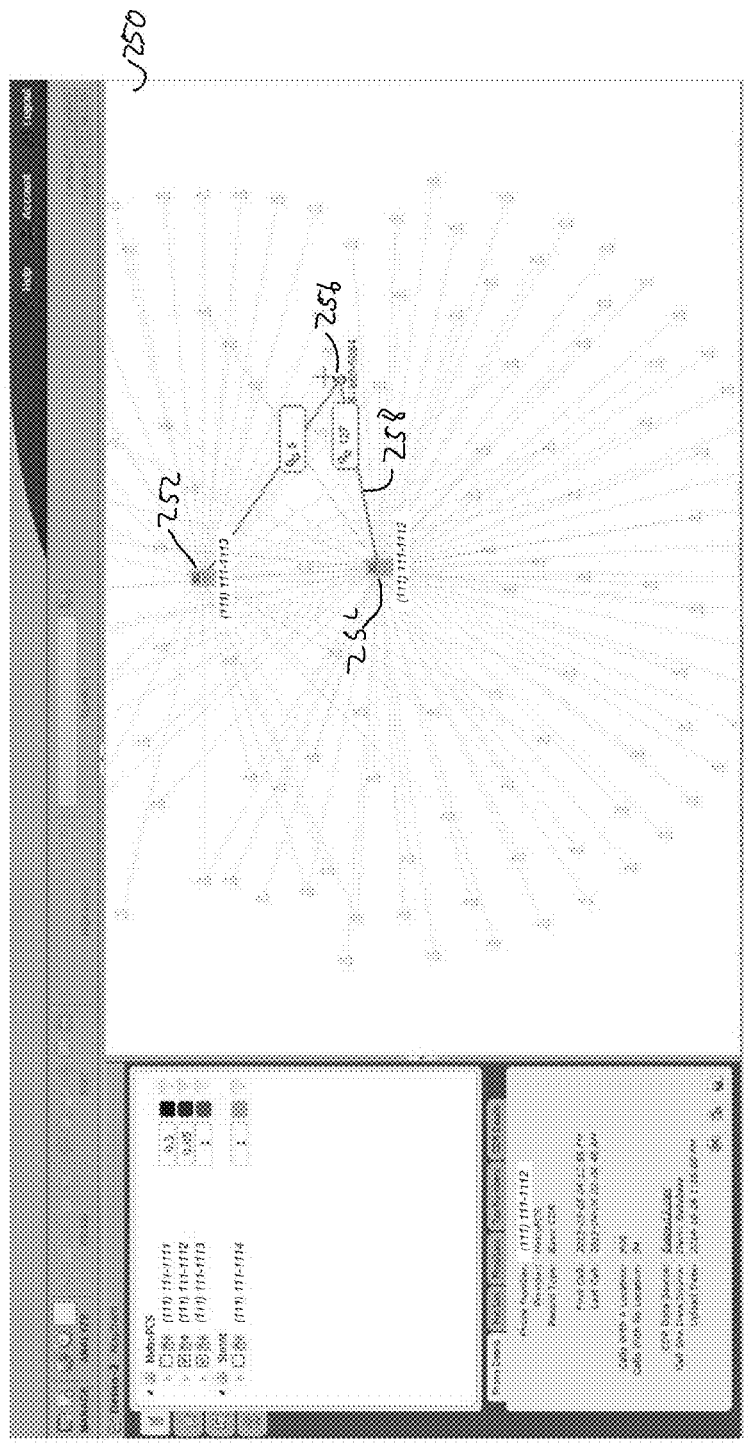

FIG. 2D illustrates a graph interface 250 of the system that may be used to visualize person-location data and/or event-location data via a force-directed graph. As shown, nodes of the force-directed graph (such as nodes 252, 254, and 256) represent phone numbers. Nodes of the force-directed graph may also represent event-location data items and/or other data items. An association between two phone numbers is represented by a connecting edge. Such an associated may represent one or more person-location data items (and/or other types of data items). As shown, edge 258 between phone numbers 254 and 256 represents 127 phone calls, or 127 person-location data items. Thus, a user may easily determine connections between various phone numbers and/or further investigate the person-location data, according to various embodiments.

FIG. 3A illustrates an example of event-location data that may be imported into the interactive information map system, according to an embodiment of the present disclosure. Event-location data maybe imported into the system from, e.g., a database such as a text file, a comma-separated values file, a spreadsheet file, and/or the like. Alternatively, event-location data items may be provided individually by a user. In FIG. 3A, a table includes multiple event-location data items. Each row of the table represents a single event-location data item, and each column represents an aspect of an event-location data item.

In the example of FIG. 3A, four aspects are associated with each event-location data item, including an identifier 302, a location 304, a start time 306, and an end time 308. In other embodiments other aspects may be associated with event-location data items. The system supports various types of event-location data items, including different aspects (as described above), simultaneously. In an embodiment, event-location data imported into the system may include locations associated with various law enforcement cases (e.g., crimes) that are currently unsolved.

Figure 3B:
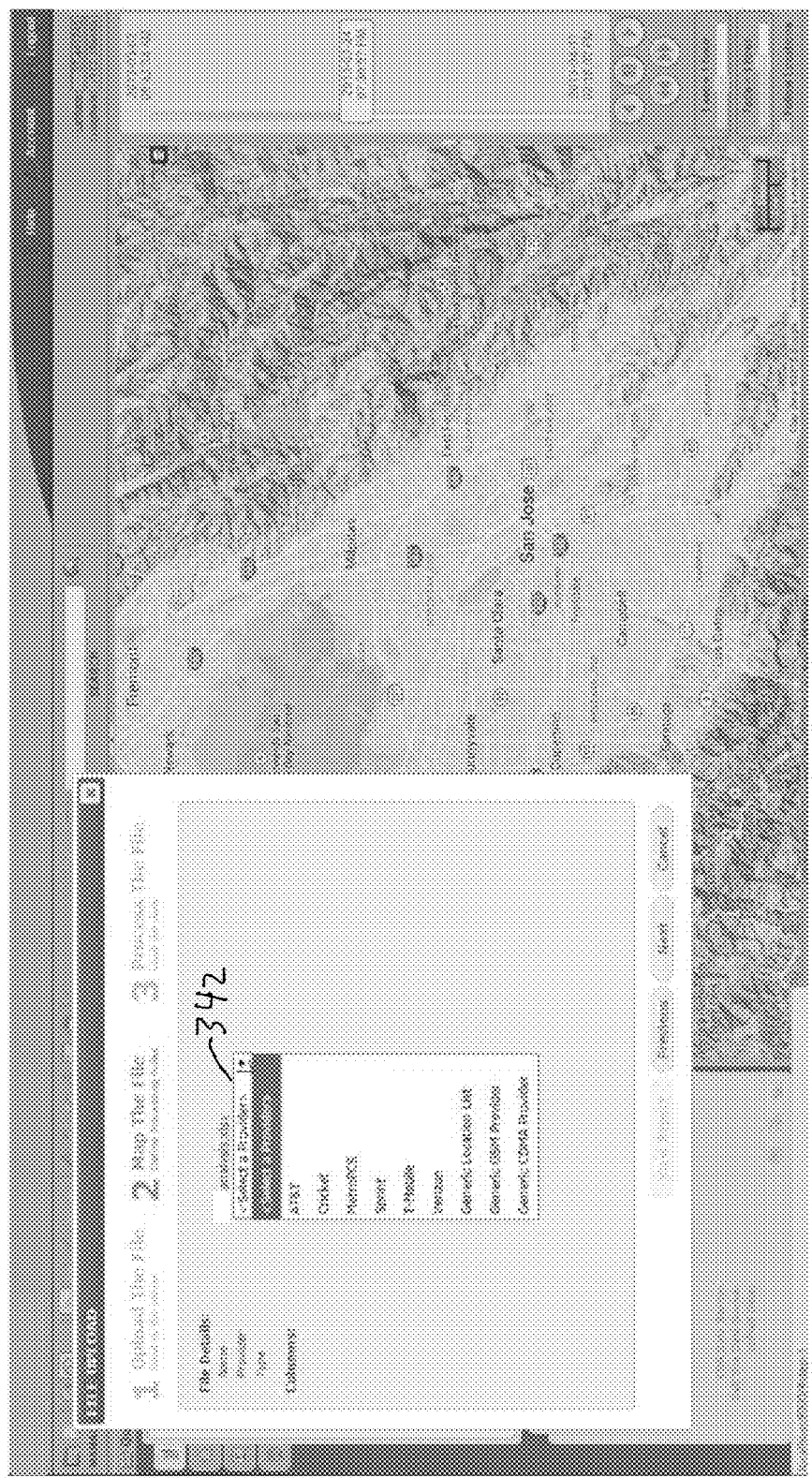
FIGS. 3B-3C illustrate example user interfaces of the interactive information map system in which data is imported into the system, according to embodiments of the present disclosure.
Figure 3C:
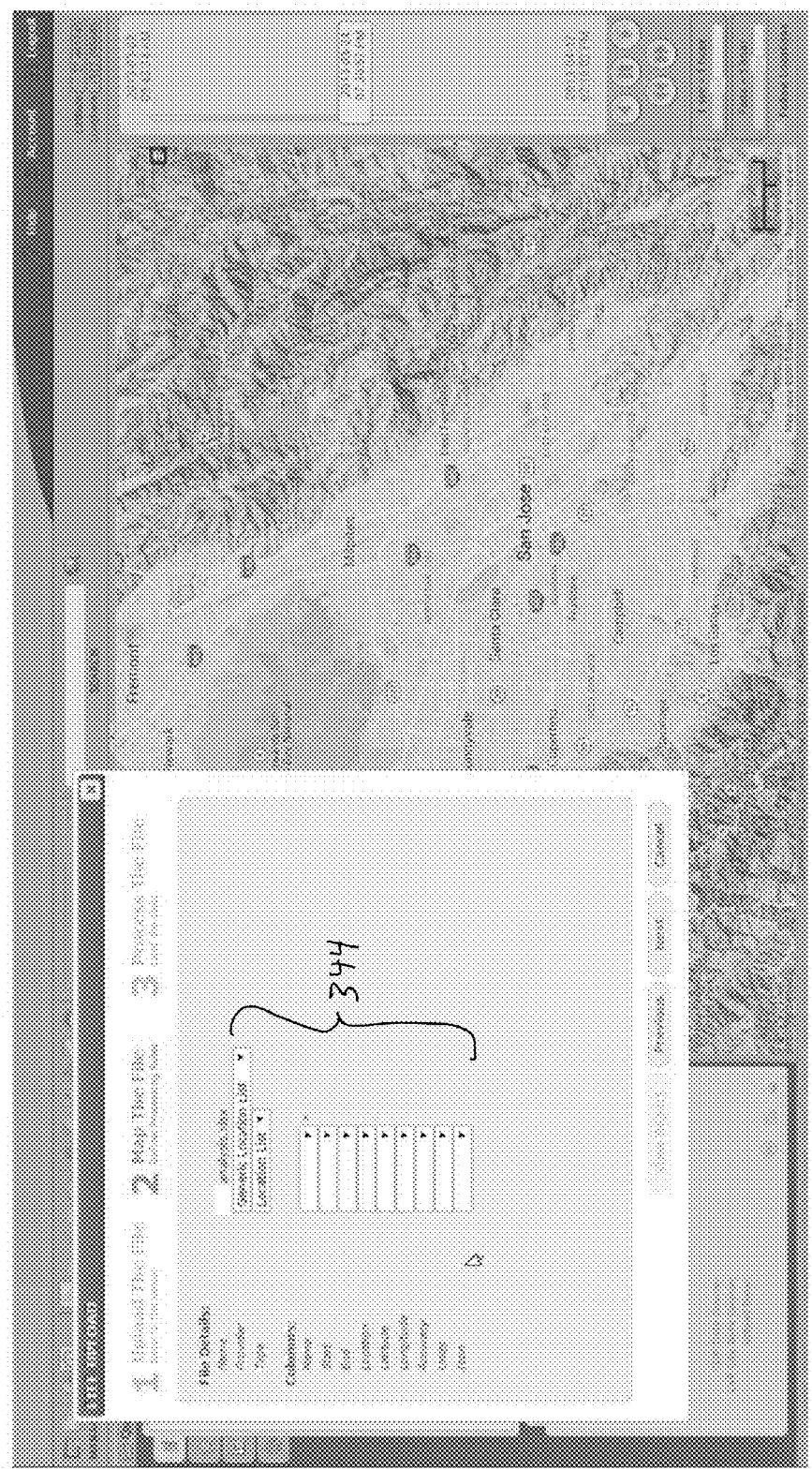

FIGS. 3B-3C illustrate example user interfaces of the interactive information map system in which data is imported into the system, according to embodiments of the present disclosure. The user may select a file to import in a first step, may select a format of the file in a second step (via e.g., drop down 342 and/or boxes 344), and then initiate import of the file in a third step.

Figure 3D:
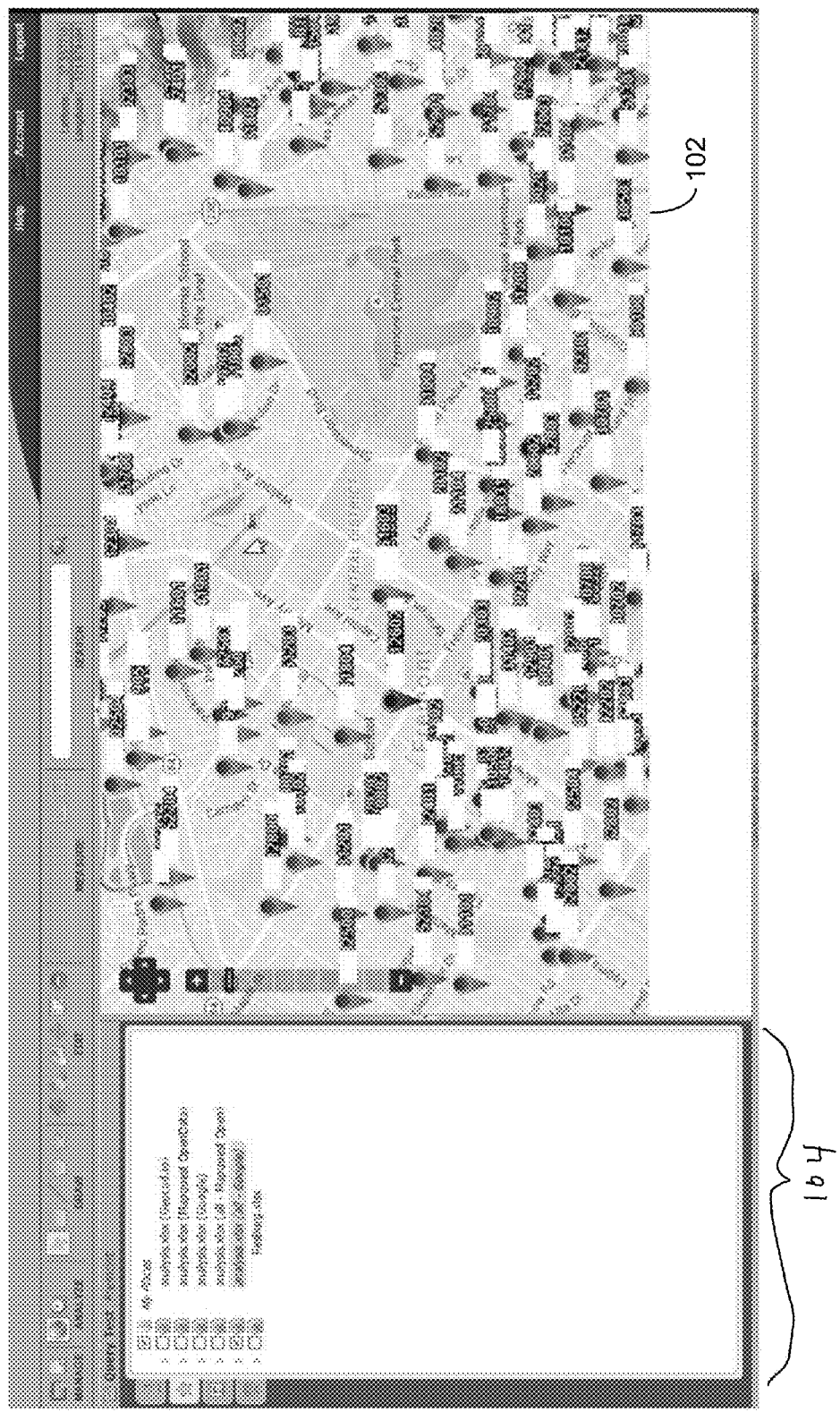
FIG. 3D illustrates an example of event-location data displayed in a user interface of the interactive information map system, according to an embodiment of the present disclosure.

FIG. 3D illustrates an example of event-location data displayed in a user interface of the interactive information map system, according to an embodiment of the present disclosure. Sidebar 104 lists various sets of event-location data that have been imported into the system. The user may select one or more of the sets of event-location data to view event-location data items associated with the selects sets in the map interface 102. Each event-location data item is displayed with a marker icon and identified by its associated identifier. As with the person-location data items described above, the user may select a particular event-location data item in the map interface 102 to view details associated with the selected event-location data item in a popup.

Figure 3E:
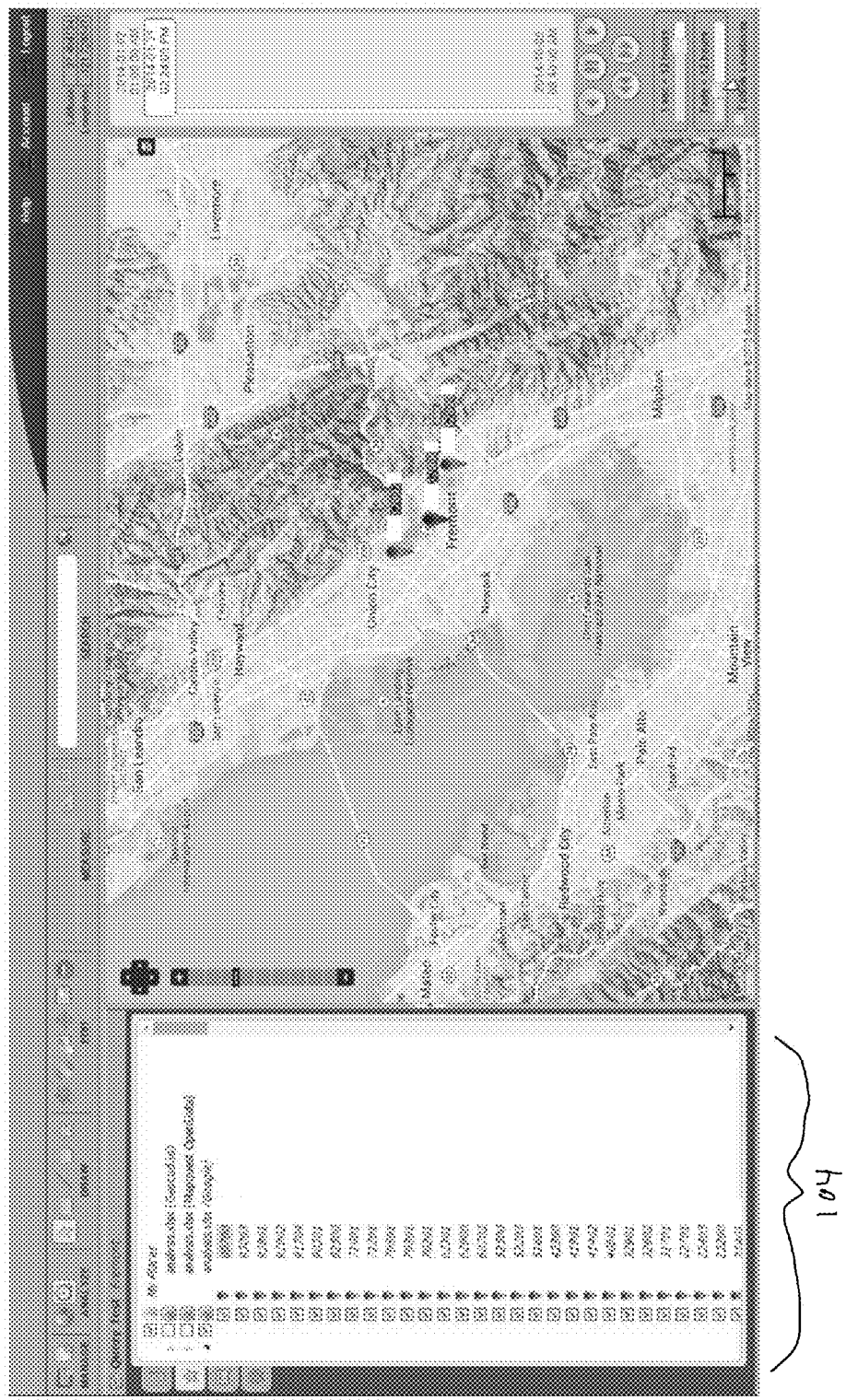
FIG. 3E illustrates an example of animated display of data in a user interface of the interactive information map system, according to an embodiment of the present disclosure.

FIG. 3E illustrates an example of animated display of data in a user interface of the interactive information map system, according to an embodiment of the present disclosure. As shown in the sidebar 104, the user may optionally select each individual event-location data item associated with a set of event-location data. Selected event-location data items may be animated in the map interface 102 in a manner similar to that described above for person-location data item in reference to FIGS. 2B-2C.

Figure 4A:
FIGS. 4A-4F illustrate example user interfaces of the interactive information map system in which a search query is input by a user, according to embodiments of the present disclosure.

FIGS. 4A-4F illustrate example user interfaces of the interactive information map system in which a search query is input by a user, according to embodiments of the present disclosure. Referring to FIG. 4A, previous search queries 402 of the user may be stored by the system, and may be conveniently selected by the user. Alternatively, the user may specify a search query by selection of dropdown boxes 404, as described below in reference to FIGS. 4B-4F.

Figure 4B:
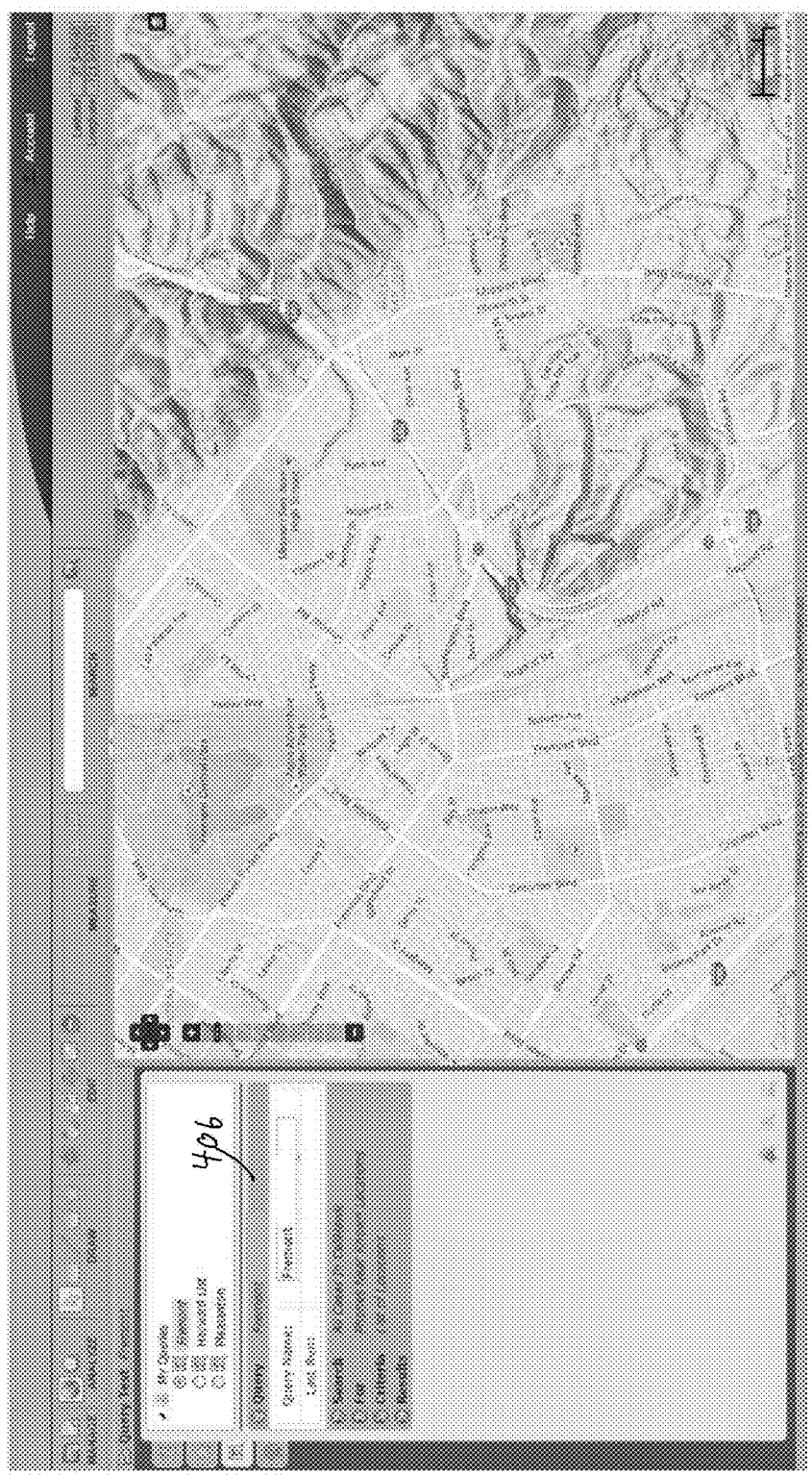

Referring to FIG. 4B, by selection of "Query" dropdown box 406, the user may provide a name of the search query.

Figure 4C:
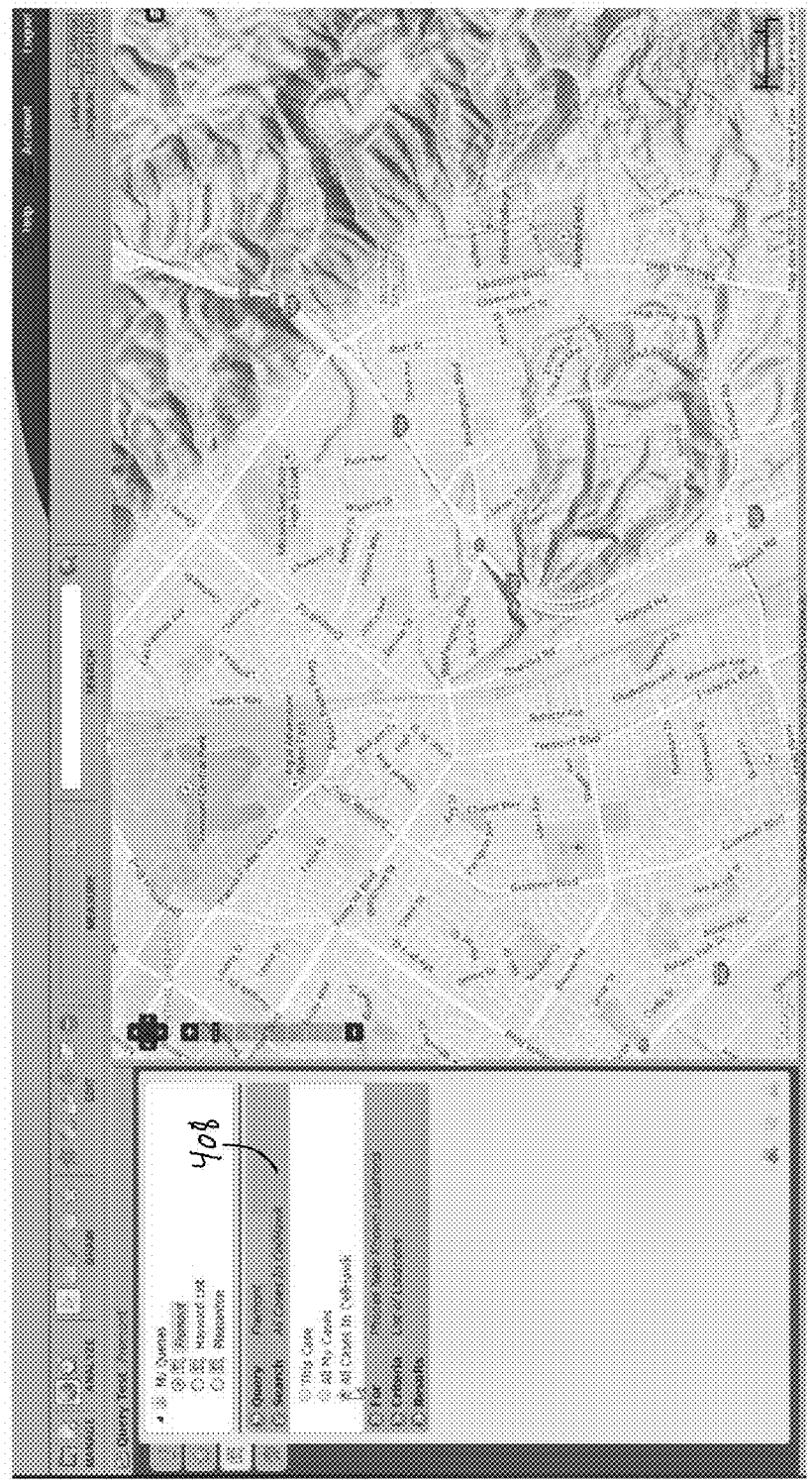

Referring to FIG. 4C, by selection of "Search" dropdown box 408, the user may select particular person-location data to be searched and matched. For example, the user may select to search using all person-location data stored by the system, only person-location data associated and/or imported by the user into the system, and/or any other subset of person-location data in the system. In an embodiment, person-location data may be organized by the system into "cases" and/or other groups. In an embodiment, the user may only be authorized to use a particular set of person-location data for searching. As described above, person-location data may include Cell Phone Call Detail Records (CDR) (that include, e.g., a call time and location of related cell phone antennas and/or towers used), Cell Phone Location Detail Records (LDR) (that include, e.g., a time and estimated location of a phone), other types of call records or cell phone location records, GPS Tracker information, and/or any other timestamped location information associated with a person.

Figure 4D:
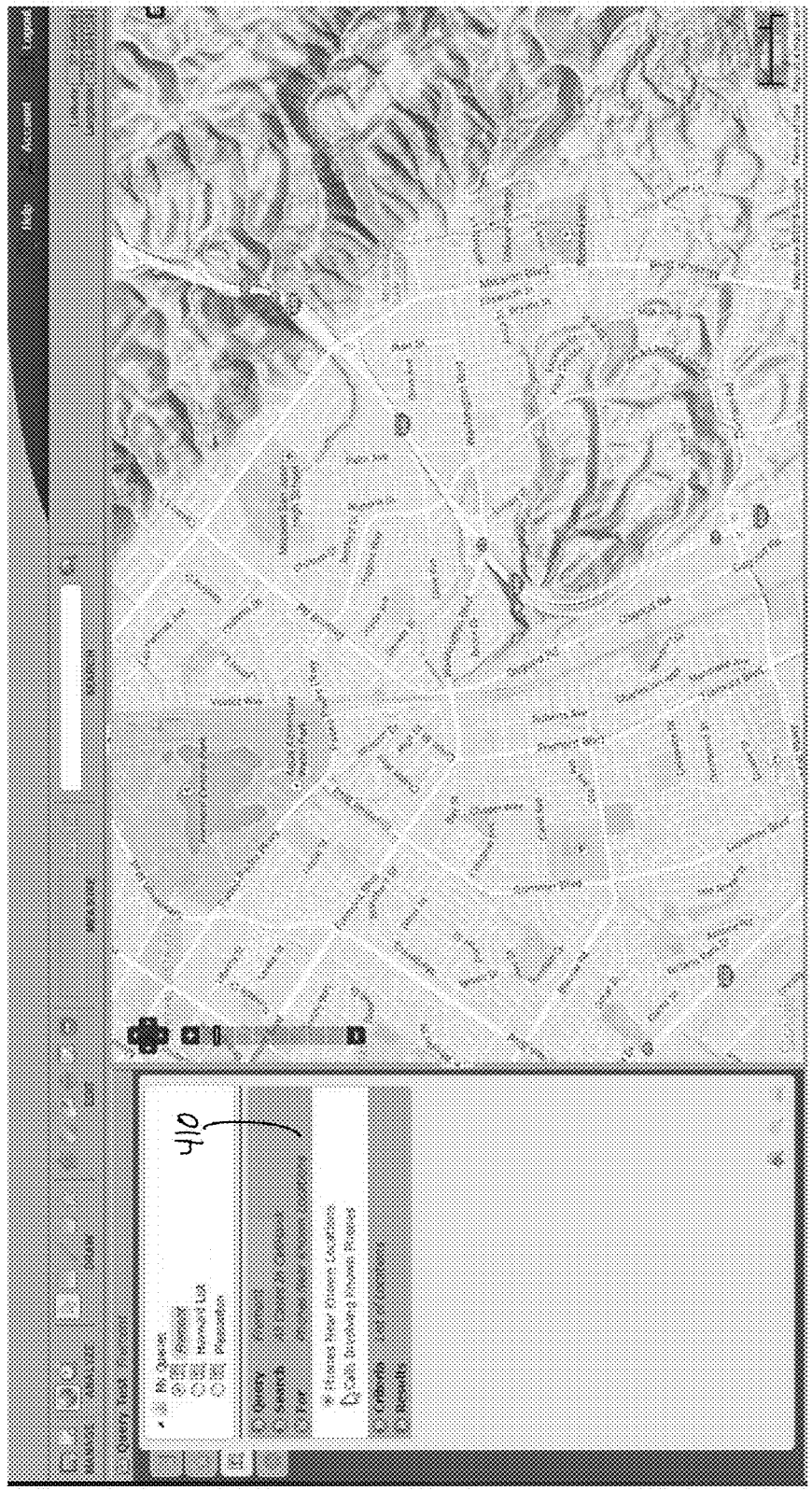

Referring to FIG. 4D, by selection of "For" dropdown box 410, the user may specify a type of search to be performed. For example, the user may select to search for "Phones Near Known Locations," meaning that matches between locations of person-location data items ("Phone") and locations of event-location data items ("Location") are to be determined. The user may also search for "Calls Involving Known Phones," meaning that matches between phone numbers of person-location data items ("Calls") and phone numbers of event-location data items ("Known Phones") are to be determined. Other types of matches between person-location data and event-location data may also be determined by the system.

Figure 4E:
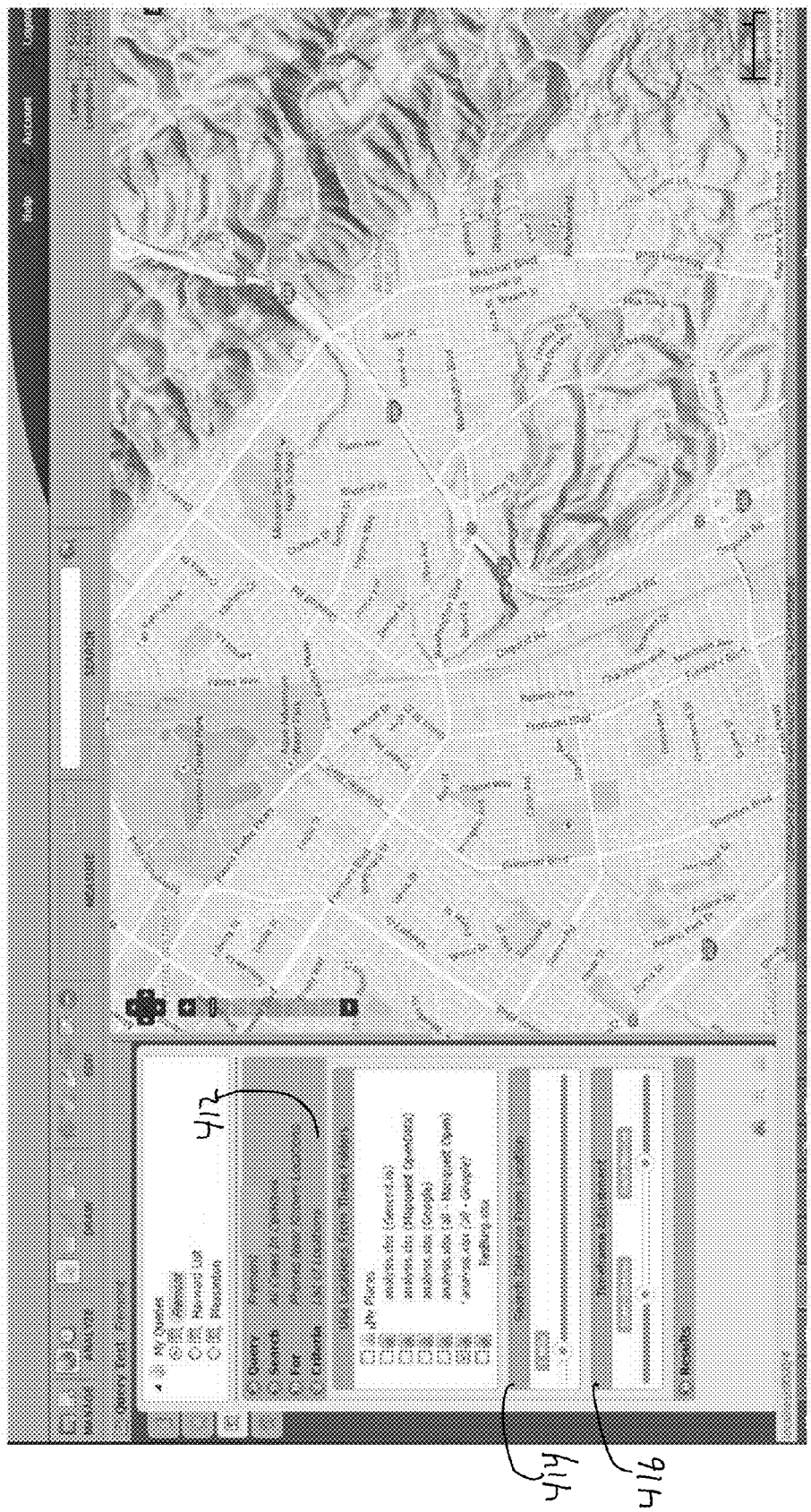

Referring to FIG. 4E, by selection of "Criteria" dropdown box 412, the user may select particular event-location data to be searched and matched. For example, the user may select to search using all event-location data stored by the system, only event-location data associated and/or imported by the user into the system, and/or any other subset of event-location data in the system. In an embodiment, event-location data may be organized by the system into "cases" and/or other groups. Thus, a user may have a group of cold cases (e.g., unsolved crimes) they are trying to solve, and may search using event-location data associated with just that group of cold cases.

Via slider 414 the user may specify a search distance (also referred to herein as a "distance constraint") from each event-location data item. For example, by specifying one mile search distance, any person-location data items having a location within one mile of a location of an event-location data item (and also satisfying the timeframe requirement described below) will be determined to be a match.

Via slider 416 the user may specify a timeframe constraint for each event-location data item. For example, by specifying "Start −30 min" and "End+30 min", any person-location data items having a time within +/−30 minutes of a time of an event-location data item (and also satisfying the search distance requirement described above) will be determined to be a match.

In various embodiments, the user may specify any ranges for the distance constraint and/or the timeframe constraint. In some examples, an infinite distance constraint and/or an infinite timeframe constraint may be specified.

Figure 4F:
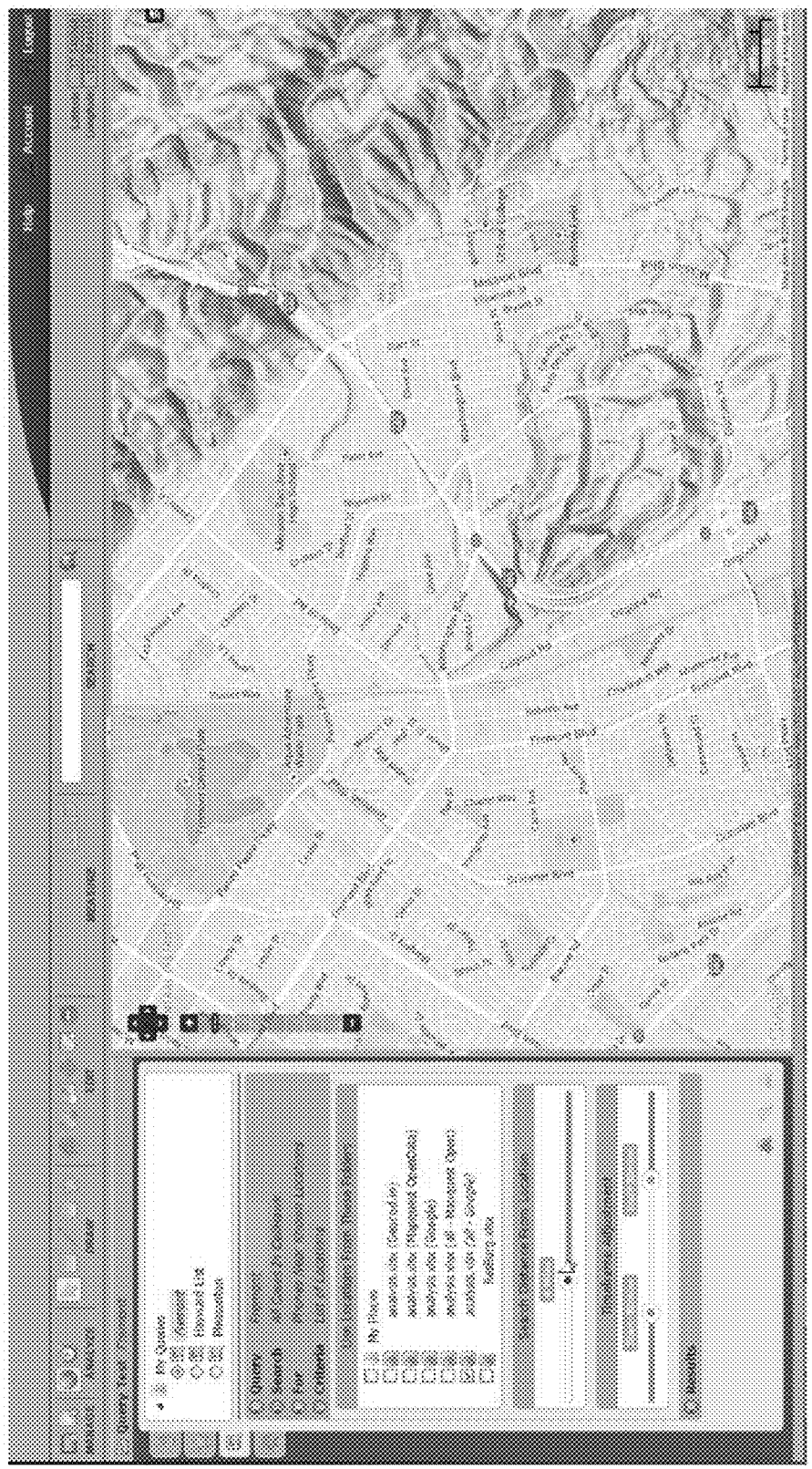

FIG. 4F illustrates an example of a user adjusting the distance constraint by movement of the slider 414.

Figure 8A:
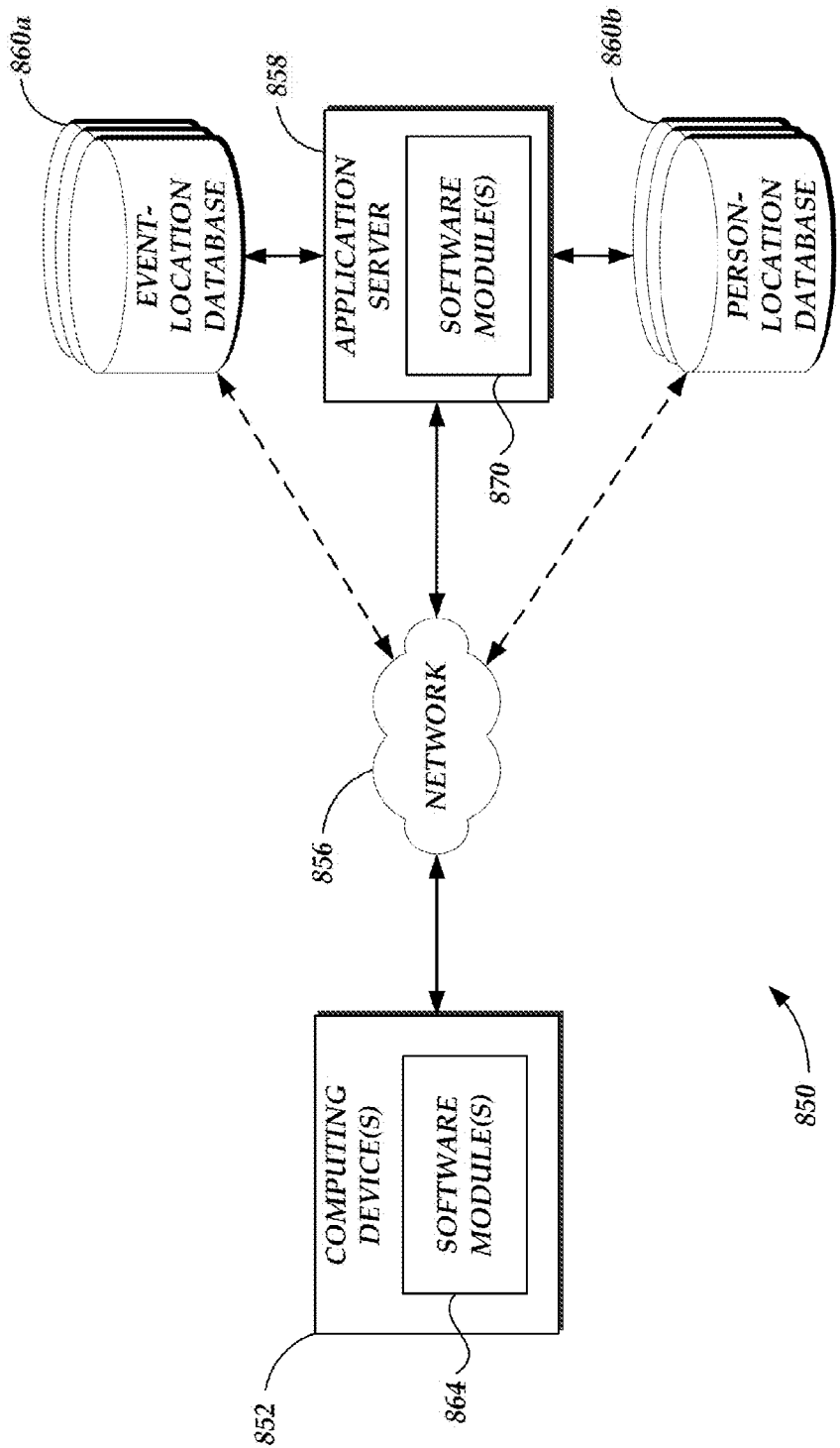
FIG. 8A illustrates an example network environment in which various methods and systems discussed herein may be implemented, according to an embodiment of the present disclosure.
Figure 8B:
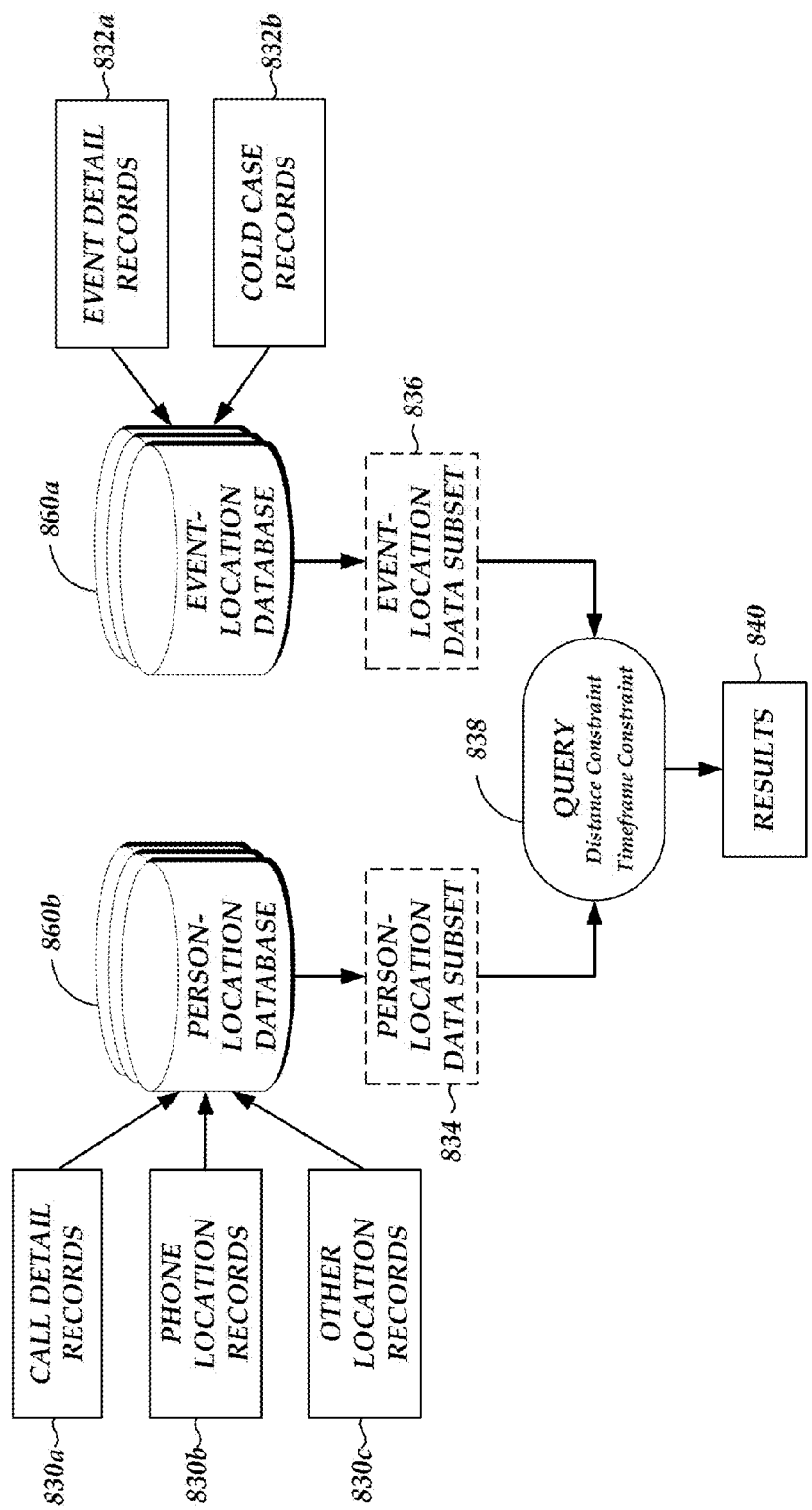
FIG. 8B illustrates an example data flow of the interactive information map system, according to an embodiment of the present disclosure.

FIG. 8B illustrates an example data flow of the interactive information map system in which a search query is performed, according to an embodiment of the present disclosure. As shown, and as described above and below, a person-location database 860b of the system includes various person-location data items from various sources including, but not limited to, Cell Phone Call Detail Records 830a, Cell Phone Location Detail Records 830b, and/or other person location records 830c. Further, as shown and as described above and below, an event-location database 860a of the system includes various event-location data items from various sources including, but not limited to, various event detail records and/or cold case records.

At block 834, and as described above in reference to FIG. 4C, the user may optionally specify a subset of the person-location data to search. Similarly, at block 836, and as described above in reference to FIG. 4E, the user may optionally specify a subset of the event-location data to search.

At block 838, determined person-location data and event-location data are processed by the system according to a search query of the user, including an optional distance constraint and an optional timeframe constraint (as described above in reference to FIG. 4E). Search results are determined by applying both the distance constraint (if specified) and the timeframe constraint (if specified) to the person-location data and the event-location data to determined matches.

For example, person-location data item 1 may indicate that person 1 was located at location 1 at time 1. Event-location data item 1 may indicate that event 1 occurred at location 2 at time 2. The system determines whether location 1 and location 2 are within the distance constraint of each other, and whether time 1 and time 2 are within the timeframe constraint of each other. If both location 1 and location 2 are within the distance constraint of each other, and time 1 and time 2 are within the timeframe constraint of each other, the system determines that person-location data item 1 matches event-location data item 1. Such determinations are made for each combination of person-location data items and event-location data items specified in the search query.

Thus, in another example, the system may enable the user to determine, using the person-location data provided by the user's agency and a set of event-location data items, whether any person-location data items place a person within 2 miles of any event-location (associated with an event-location data item) from 1-hour before until 2-hours after the event (of the event-location data item.

At block 840, results of the search query are presented to the user by the system and via the interactive user interface, as described below.

FIGS. 5A-5D illustrate example user interfaces of the interactive information map system in which search query results are accessed and displayed, according to embodiments of the present disclosure. As described above, search results may include various matches between person-location data items and event-location data items. For example, events associated with an unsolved crime (e.g., a bank in location 1 was robbed at time 1) match certain call records of a person (e.g., person 1 made a call from location 1 at time 1). Further, search results of the system may provide additional evidence and certainty from unsolved crimes by matching up a person's location with multiple crimes (e.g., a bank in location 1 was robbed at time 1 and a second bank at location 2 was robbed at time 2, and a person made calls from both locations and the respective times).

Figure 5A:
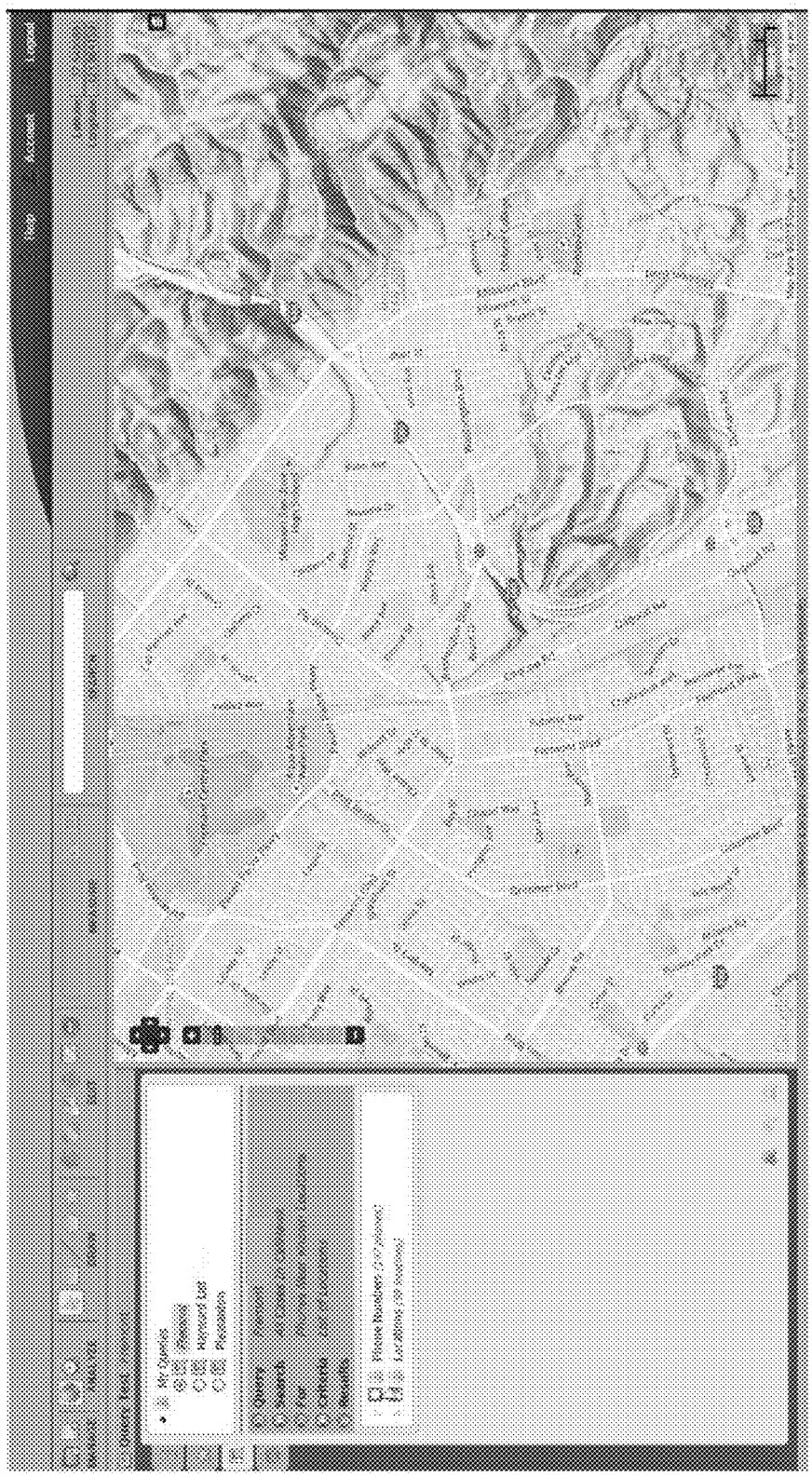
FIGS. 5A-5D illustrate example user interfaces of the interactive information map system in which search query results are accessed and displayed, according to embodiments of the present disclosure.
Figure 5B:
Figure 5C:
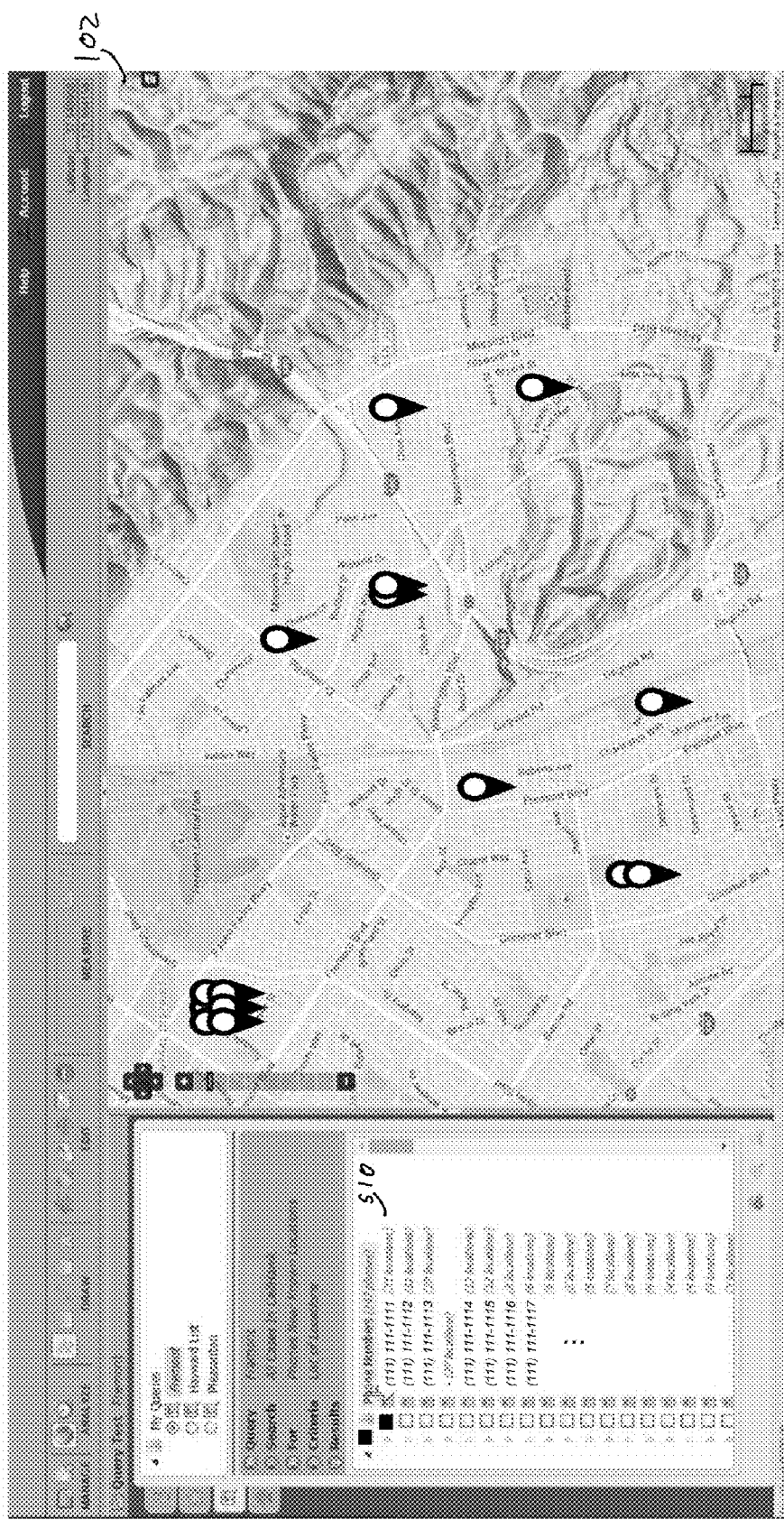

Referring to FIG. 5A, the user may select to view search results including matching phone numbers and/or matching locations. In FIG. 5B, a list of matching phone numbers is expanded. Person-location data items that match event-location data items in the search are group according to associated phone numbers. Thus, for example, phone number 510 (e.g., (111) 111-1111) matches event-location data items 31 times (or at 31 locations). In FIG. 5C, the user may select phone number 510 to view locations associated with that phone number that match event-location data items. The locations are shown in the map interface 102 by markers or icons. In an embodiment, identifiers may also be displayed in the map interface along with the markers or icons. As described above, the user may select individual markers to view details associated with those events/persons. Additionally, the user may animate selected results as described above. Thus, the user may view movements of a person (associated with a phone number) from one location to another (where the locations match locations of interest from the event-location data items of the search).

Similarly, the user may select/view search results as organized by location rather than phone number.

When a suspicious person is identified, the system allows the user to further investigate the activities of the person. For example, the user may animate movements of the person over time using person-location data associated with the person. For example, the user may use the system to determine that the person frequently travels a certain distance from a home location (where the person is located most of the time) and makes phone calls from locations of robberies (at times associated with those robberies).

Figure 5D:
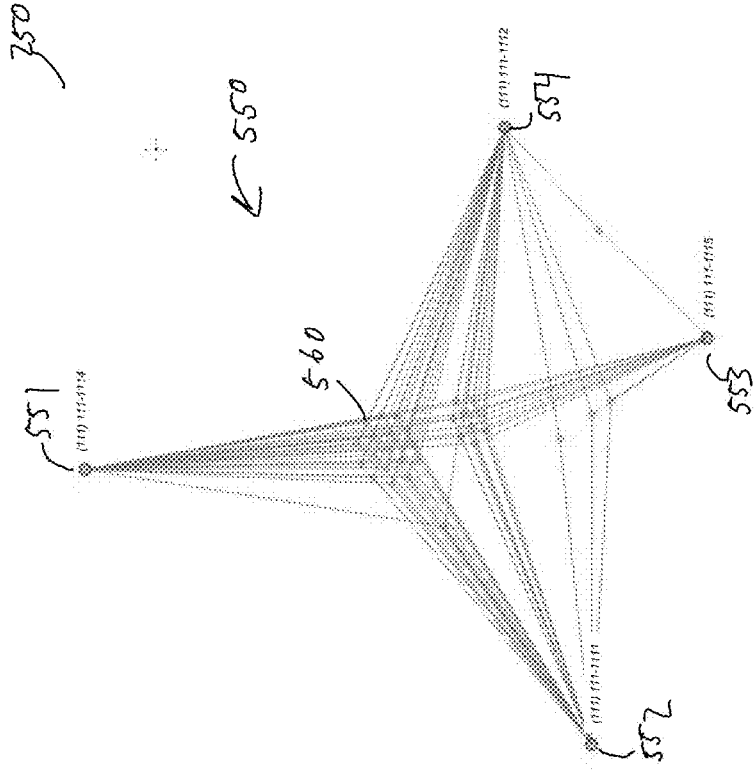
Figure 5D:
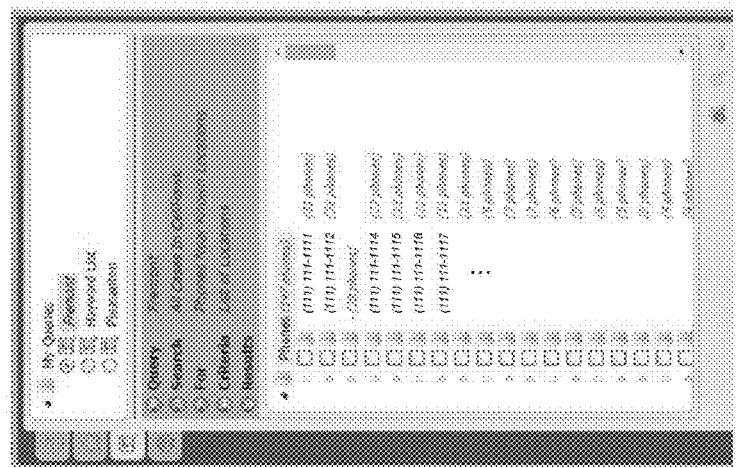

Referring to FIG. 5D, search results may be viewed in the graph interface 250 for the system, similar to the description provided above in reference to FIG. 2D. In particular, search query matches may be represented as nodes and edges in a force-directed graph. In an embodiment, some nodes (e.g., nodes 551, 552, 553, and 554) of the force-directed graph 550 may represent phone numbers, while other nodes (e.g., node 560) may represent events. Edges connecting events and phone numbers in the force-directed graph 550 may indicate associations between phone number and the connected events (e.g., a call was made from the connected phone number at a time and location matching the event-location data item associated with the event). Thus, a user may quickly determine that multiple phone numbers (e.g., and persons associated with those phone numbers) are connected to particular events and to one another.

Figure 7:
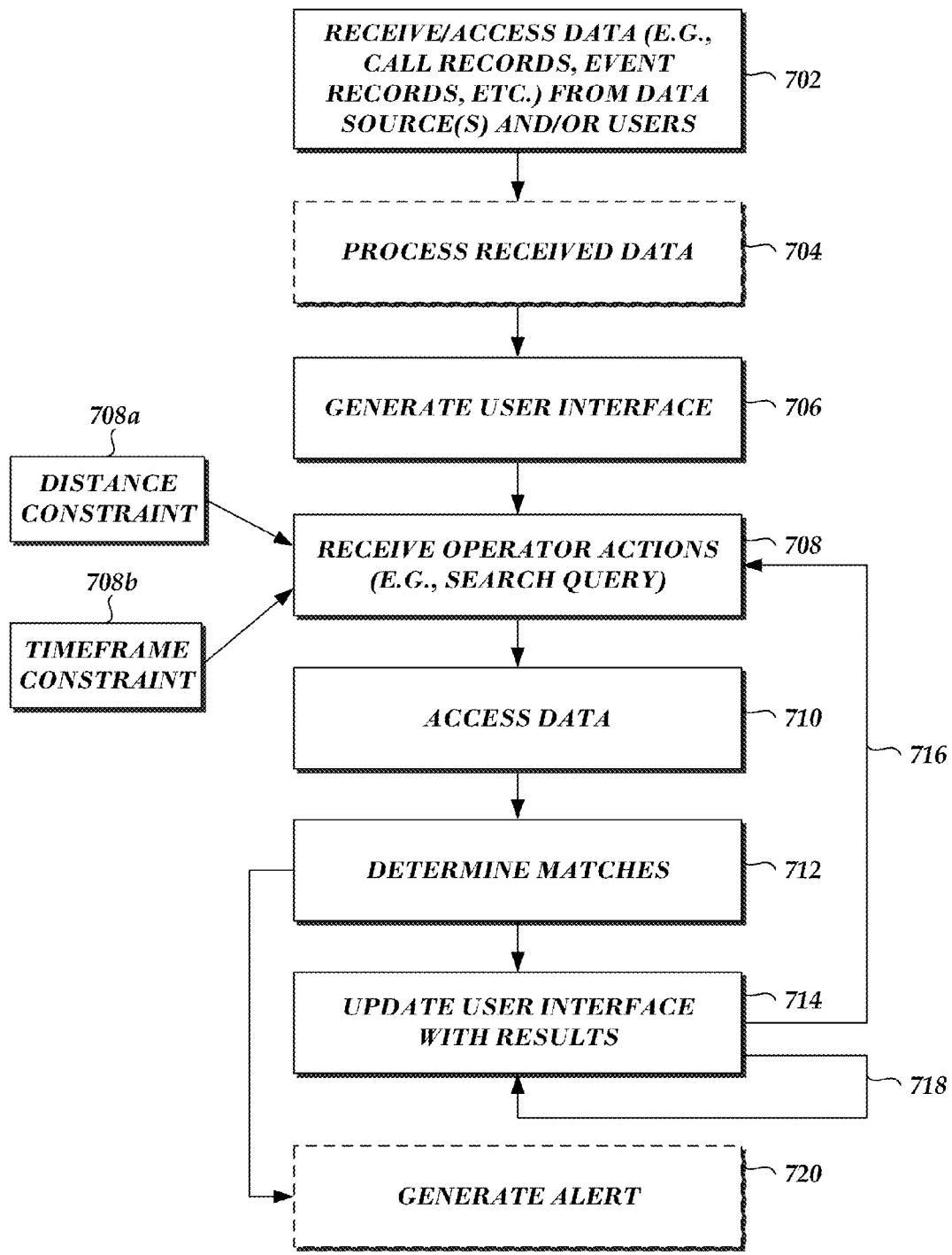
FIG. 7 shows a flowchart depicting an illustrative operation of the interactive information map system, according to an embodiment of the present disclosure.

FIG. 7 shows a flowchart depicting an illustrative operation of the interactive information map system, according to an embodiment of the present disclosure. In various embodiments, fewer blocks or additional blocks may be included in the processes, or various blocks may be performed in an order different from that shown in FIG. 7. In an embodiment, one or more blocks in FIG. 7 may be performed by, or implemented in, one or more computer modules and/or processors, as is described below with reference to FIGS. 8A-8C.

At block 702, various event-location data and person-location data may be received and/or accessed by the system from various databases and/or data sources (including, for example, from databases maintained by private entities, law enforcement entities, government entities, and/or the like). In an embodiment, the event-location data and person-location data may be received at a server-side component of the system, such as the application server 858 of FIG. 8A. The data may then optionally be processed by the server at block 704. For example, the event-location data and person-location data may be organized by location, time, type, and/or by any other useful index so as to enable fast searching of the data. At block 706, a user interface (and/or user interface data) is generated that displays (and/or is useable to generate and display) a user interface, as described with reference to the figures above and below. For example, a map interface and various search query options may be displayed on the user interface.

At block 708, the user may interact with the user interface of the system in any of the ways described above, and as further described below. For example, the user may import data, interact with the map interface, provide various search query criteria, etc. As described above, providing a search query criteria may include a distance constraint 708a and/or a timeframe constraint 708b. At block 710, the processed event-location data and person-location data may be accessed by the system based on the provided search query, and, at block 712, data (including matches) satisfying the provided search query may be determined and/or identified. Matches are determined as described above in reference to FIG. 8B.

In various embodiments, the map system may access various internal and/or external databases in response to user actions. The various accessed internal and/or external databases may or may not include the processed event-location data and person-location data described above.

At block 714, the user interface may be updated in response to the user's actions. For example, search results may be displayed in lists and/or in the map interface, and/or animations may be provided, among other interface updates described above. As indicated by arrow 716, the operation may continue to block 708 such that the user may update and/or input a new search query. Alternatively, as indicated by arrow 718, the operation may continue to update the user interface and the user interacts with the system in any of the various ways described here.

In various embodiments, event-location data and person-location data may be received and processed by the system at any time and/or continuously. In an embodiment, event-location data and person-location data may be updated even as the user is viewing the data on the user interface. For example, in an embodiment, the user may use the system to analyze substantially real-time event-location data and person-location data.

At optional block 720, the system may generate alerts to the user. Alerts may comprise electronic notifications of changes and/or updates, for example, related to a user's search. For example, as event-location data and person-location data is updated in the system, the system may determine new or different matches, or may determine that user interfaces are or would be updated as a result of the updates. Accordingly, in order that the user may be made aware of these changes in a timely manner, an alert and/or notification may be automatically transmitted, for example, to a mobile device (or other device) operated by the user. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., an interactive information map system application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the interactive information map system so that the user can log in to the interactive information map system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Figure 6A:
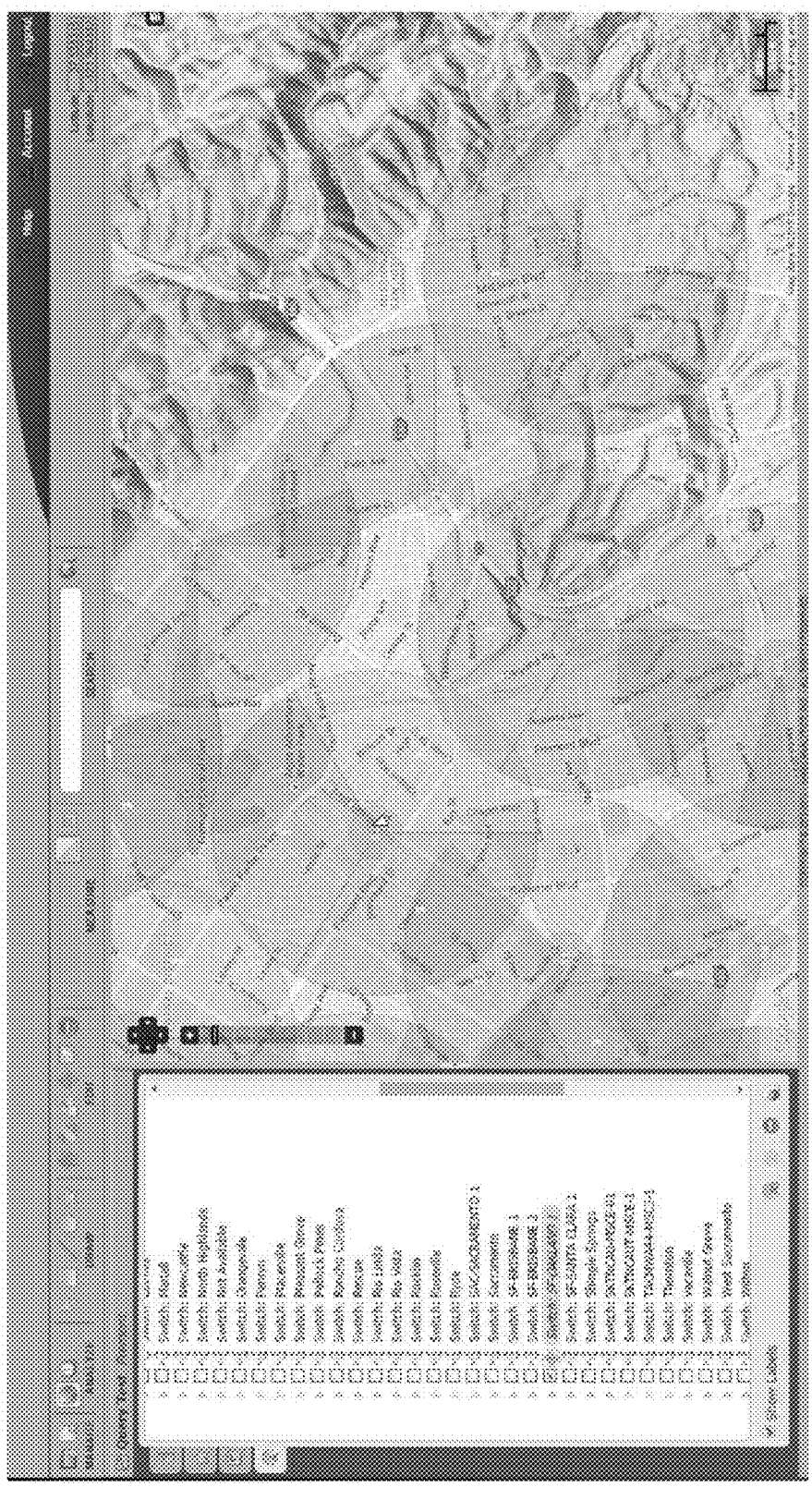
FIGS. 6A-6D illustrate example user interfaces of the interactive information map system in which a cell phone tower and/or phone information is displayed to a user, according to embodiments of the present disclosure.
Figure 6B:
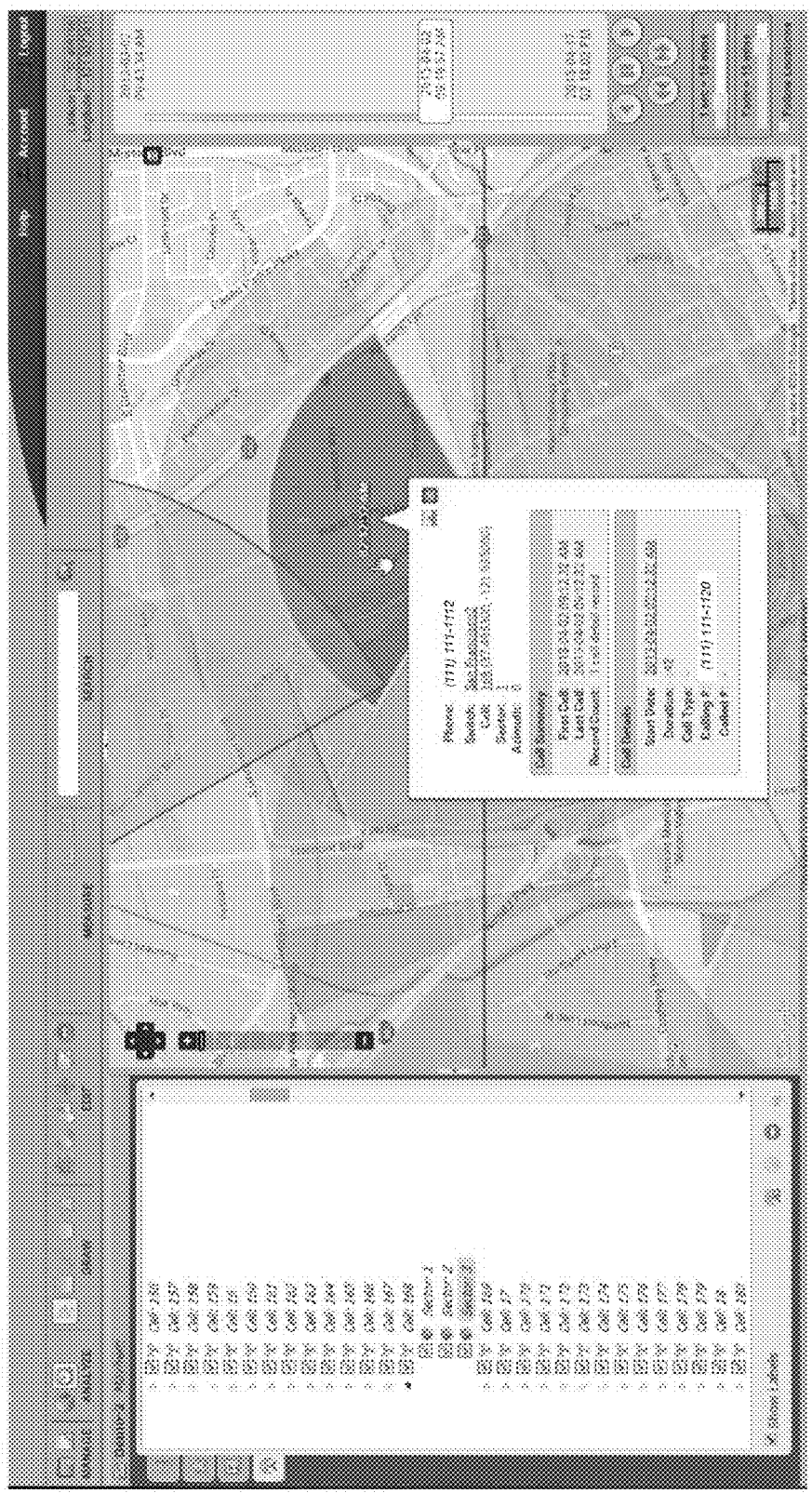
Figure 6C:
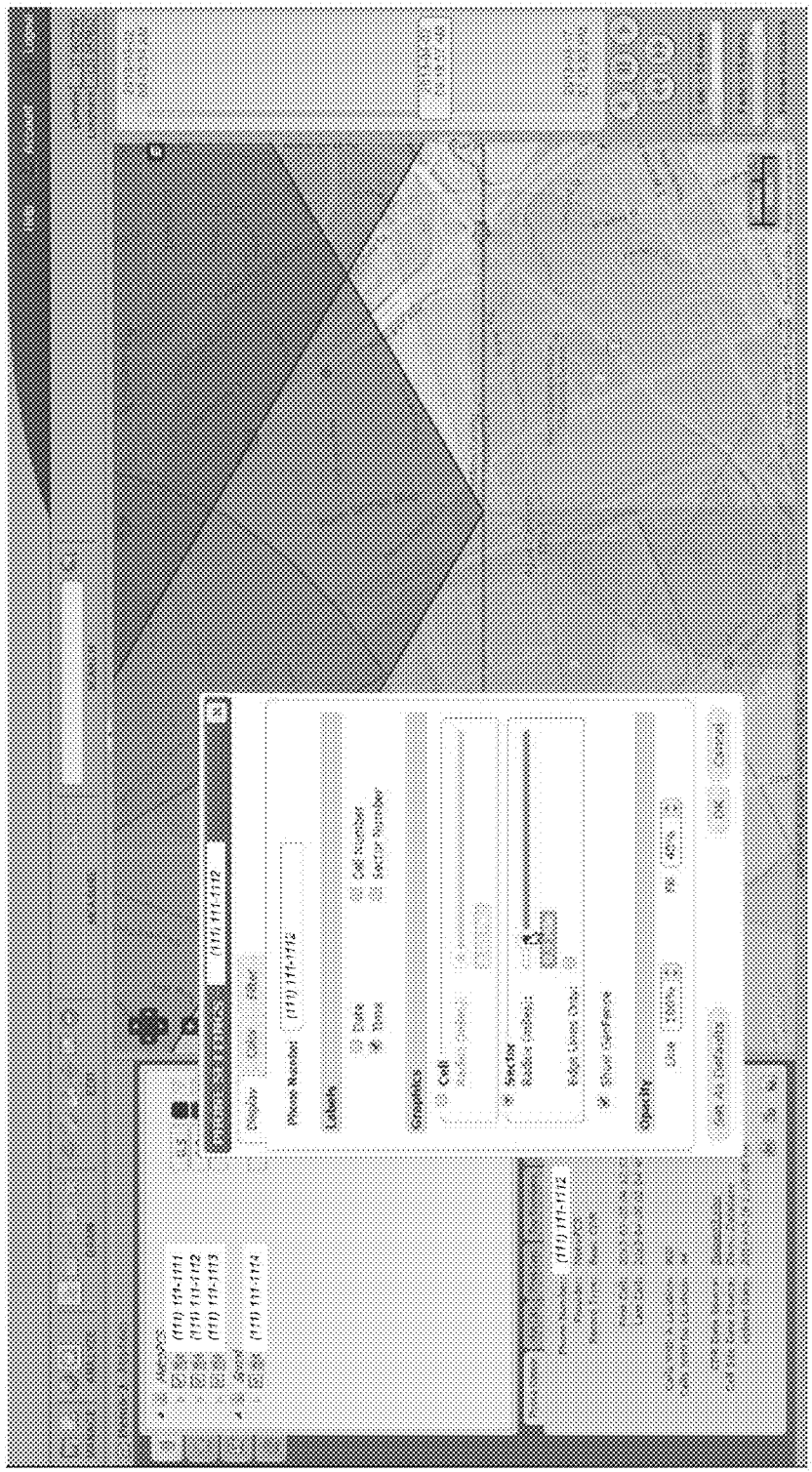
Figure 6D:
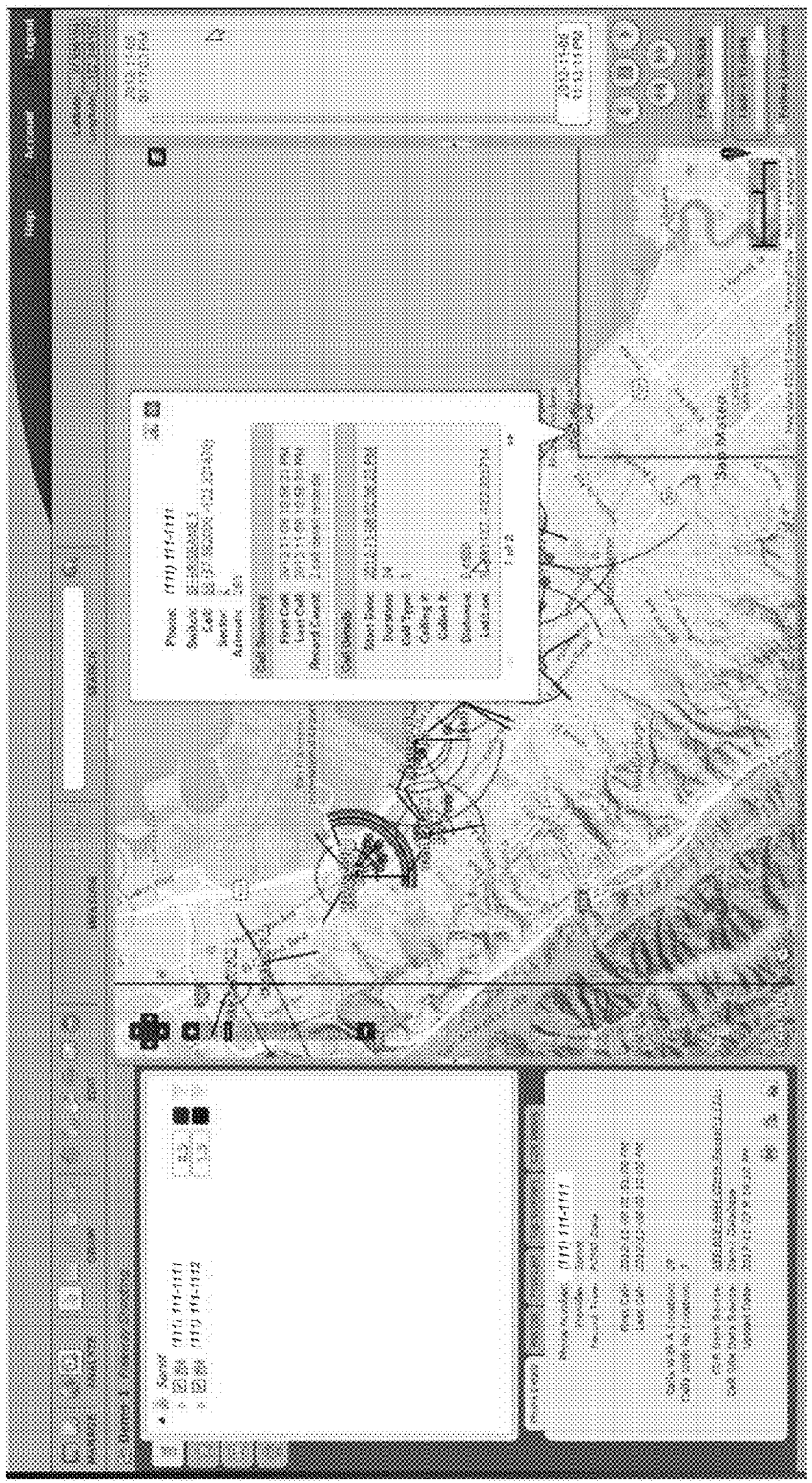

FIGS. 6A-6D illustrate example user interfaces of the interactive information map system in which a cell phone tower and/or cell phone information is displayed to a user, according to embodiments of the present disclosure. FIG. 6A illustrates data associated with various cell phone towers being displayed in the map interface. FIG. 6B illustrates selection of a person-location record associated with a particular cell phone tower, and display of detailed information regarding the select record. FIG. 6C illustrates settings associated with a phone number. FIG. 6D illustrates additional data associated with various cell phone records being displayed in the map interface. FIG. 6D shows that the system may include, for particular person-location data items, information regarding distances from a cell phone tower.

The various user interfaces shown in the various figures described above, according to various embodiments, are illustrative. In other embodiments certain user interface elements may appear differently and/or be arranged differently while still accomplishing the system and processes described.

Implementation Mechanisms

FIG. 8A illustrates a network environment in which the interactive information map system may operate, according to embodiments of the present disclosure. The network environment 850 may include one or more computing devices 852, a network 856, an application server 858, and one or more data sources 860 (including, e.g., an event-location database 860a and a person-location database 860b). The constituents of the network environment 850 may be in communication with each other either locally or over the network 856.

In an embodiment, the computing device(s) 852 may be any computing devices capable of displaying software applications to a user and receiving input from the user. For example, the computing device(s) 852 may include smartphones, tablets, laptops, and/or other types of computing devices. The computing device(s) 852 may also be capable of communicating over the network 856, for example, to request data from, and/or to data to, the application server 858.

In some embodiments, the computing device(s) 852 may include non-transitory computer-readable medium storage for storing event-location data, person-location data, and/or other map application data. For example, computing device(s) 852 may include one or more software modules 864 that may implement aspects of the functionality of the interactive information map system. The software module(s) 864 may be configured to present the map application to a user and receive interactions from the user. Additional aspects, operations, and/or functionality of computing device(s) 852 are described in further detail in reference to FIGS. 8B and 8C above and below.

The network 856 may be any wired network, wireless network, or combination thereof. In addition, the network 856 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The application server 858 is a computing device, similar to the computing devices described above, that may perform a variety of tasks to implement the operations of the interactive information map system. The application server 858 may include one or more software modules 870 that may be configured to, for example, receive event-location and/or person-location data, process the received data, generate user interfaces and/or user interface data, process inputs from the user, and/or update the user interface. Additional aspects, operations, and/or functionality of application server 858 are described in further detail in reference to FIGS. 8B and 8C above and below.

The application server 858 may be in communication with the event-location database 860a and the person-location database 860b. The event-location database 860a and the person-location database 860b may include electronic storage local to the application server 858. The event-location database 860a and the person-location database 860b may be embodied in hard disk drives, solid state memories, and/or any other type of non-transitory, computer-readable storage medium remotely or locally accessible to the application server 858. The event-location database 860a and the person-location database 860b may also be distributed or partitioned across multiple storage devices, and/or may be combined into a single database, as is known in the art without departing from the spirit and scope of the present disclosure. As indicated by the dashed arrows of FIG. 8A, the event-location database 860a and the person-location database 860b may alternative, or in addition, be in communication with the application server 858 and/or the computing device(s) 852 via the network 856.

In various embodiments, the system may be accessible by the user through a web-based viewer, such as a web browser. In this embodiment, the user interface may be generated by the application server 858 and transmitted to the web browser of the user. Alternatively, data necessary for generating the user interface may be provided by the application server 858 to the browser, where the user interface may be generated. The user may then interact with the user interface through the web-browser. In an embodiment, the user interface of the interactive information map system may be accessible through a dedicated software application. In an embodiment, the user interface of the interactive information map system may be accessible through a mobile computing device, such as a smartphone and/or tablet. In this embodiment, the application server 858 may generate and transmit a user interface to the mobile computing device. Alternatively, the mobile computing device may include modules for generating the user interface, and the application server 858 may provide user interface data to the mobile computing device. In an embodiment, the application server 858 comprises a mobile computing device.

According to various embodiments, the interactive information map system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8C:
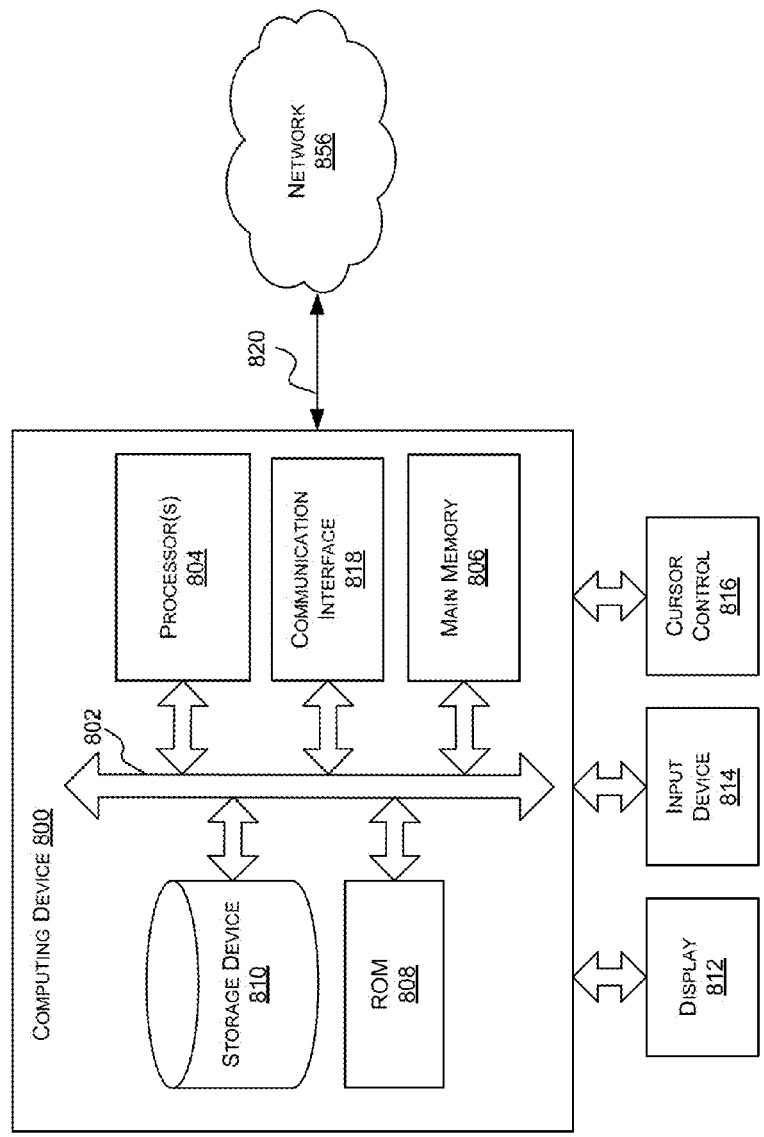
FIG. 8C illustrates example computer systems and devices on which various methods and systems discussed herein may be implemented, according to various embodiments of the present disclosure.

For example, FIG. 8C is a block diagram that illustrates a computing device 800 upon which the various systems, devices, and/or methods discussed herein may be implemented. For example, some or all aspects of computing system 800 may be included in any of computing device(s) 852 and/or application server 858. In an embodiment, each of the computing device(s) 852 and application server 858 is comprised of a computing system similar to the computing device 800 of FIG. 8C. Computing device 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computing device 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computing device 800 into a special-purpose machine that is customized to perform the operations specified in the instructions.

Computing device 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computing device 800 may be coupled via bus 802 to a display 812, such as a cathode ray tube (CRT), LCD display, and/or other electronic or computer display (which, in some embodiments, may be touch sensitive) for displaying information to a computer user and/or receiving input from the user or operator. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing device 800 may include modules configured to generate a user interface, map interface, and/or the various other aspects of the interactive information map system. These modules may include, for example, software module(s) 864 and/or software module(s) 870 described above, among others. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computing device 800 may implement the techniques described herein using customized hard-wired logic, one or more ASICs or FPGAs, firmware and/or program logic which in combination with the computer system causes or programs computing device 800 to be a special-purpose machine. According to one embodiment, the techniques herein are performed by computing device 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computing device 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computing device 800 also includes a communication interface 818 coupled to bus 802. Communication interface 818 provides a two-way data communication coupling to a network link 820 that may be connected to any other interface and/or network, for example network 856 of FIG.

8A. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through one or more local or non-local networks to host computers or other data equipment operated by an Internet Service Provider (ISP).

In an embodiment, the network link 820 may provide data communication services through the world wide packet data communication network now commonly referred to as the "Internet." Communication may be accomplished through the user of, for example, electrical, electromagnetic, and/or optical signals that carry digital data streams. The signals through the various networks and the signals on network link 820 and through communication interface 818, which carry the digital data to and from computing device 800, are example forms of transmission media.

Computing device 800 may send messages and/or receive data, including program code, through the network(s), network link 820 and communication interface 818. In the Internet example, a server or other computer-enabled device or system may transmit a requested code for an application program through one or more networks and/or communication interface 818.

Additional Embodiments

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
   one or more storage devices configured to store electronic software instructions; and
   one or more computer processors in communication with the one or more storage devices, the one or more computer processors configured to execute the electronic software instructions to cause the computing system to:
   receive, from a third-party data source, a plurality of call data records,
   extract, from the call data records, a plurality of call data record items,
   each of the call data record items including:
      at least one of a caller telephone number or a receiver telephone number;
      a call time indicating when a telephone call between a caller device having the caller telephone number and a receiver device having the receiver telephone number was initiated or connected; and at least one of: a caller location of the caller device at the call time or a receiver location of the receiver device at the call time, wherein each of the receiver locations indicates at least one of: a location of a cell phone tower or GPS coordinates;

access, from a third-party data source, a plurality of crime data records associated with one or more previously unsolved crimes;

extract, from the plurality of crime data records, a plurality of crime data record items, each of the crime data record items including:

a crime time indicating when a particular unsolved crime occurred; and a crime location indicating a geographic location of the particular unsolved crime;

receive one or more inputs from a user of the computing system indicating search query criteria comprising:

a distance constraint indicating a maximum allowable geographic distance between a caller location or a receiver location of a particular call data record item and a crime location associated with a particular crime data record item, a timeframe constraint indicating a maximum allowable time difference between a call time associated with a particular call data record item and a crime time associated with a particular crime data record item, a selection of a subset or all of the call data record items, and a selection of a subset or all of the crime data record items;

determine a plurality of pairs of call record data items and crime data record items of the selected call data record items and crime data record items;

for each determined pair of call record data items and crime record data items, in response to determining that:

a caller location or receiver location associated with the call record data item is within the distance constraint from a crime location associated with the crime record data item, and a call time associated with the call record data item is within the timeframe constraint of a crime time associated with the crime record data item, designate the call record data item and the crime record data item of the pair as a match;

generate user interface data for rendering an interactive user interface on an electronic display, the interactive user interface including an interactive map;

update the user interface data to include indications of the designated matches, each indication comprising a marker on the interactive map at respective crime locations and/or call locations associated with the call record data item or the crime record data item of the match; and provide a time-based animation of the indication of the designated matches, wherein:

the interactive user interface further includes a slider spanning a period of time associated with the designated matches, and in response to movement of the slider, markers indicative of the designated matches that are associated with points in time indicated by a location of the slider are displayed, and markers of the designated matches that are not associated with points in time indicated by the location of the slider are not displayed.

2. The computing system of claim 1, wherein the one or more computer processors are configured to execute the electronic software instructions to further cause the computing system to:

further update the user interface data to include indications of the designated matches in a force-directed graph including nodes and edges, and wherein:

the nodes represent call record data items and crime record data items, and the edges indicate relationships between matched call record data items and crime record data items that satisfy the search query criteria.

3. The computing system of claim 1, wherein the user interface includes first slider configured to receive the distance constraint via user input, and wherein the user interface includes second slider configured to receive the timeframe constraint via user input.

4. A computing system comprising:

one or more storage devices configured to store:

electronic software instructions;

a plurality of person-location data items, wherein the person-location data items are associated with respective times and locations, and wherein the respective times and locations associated with the person-location data items are extracted from cellular telephone call data; and a plurality of event-location data items associated with one or more unsolved crimes or cold law enforcement cases, and wherein the event-location data items are associated with respective times and locations; and one or more computer processors in communication with the one or more storage devices, the one or more computer processors configured to execute the electronic software instructions to cause the computing system to:

generate user interface data for rendering an interactive user interface on an electronic display, the interactive user interface including an interactive map;

receive an input from a user of the computing system including search criteria comprising:

a distance constraint, a timeframe constraint, a selection of a subset or all of the person-location data, and a selection of a subset or all of the event-location data; and in response to the input:

identify, from the one or more storage devices, one or more matches that satisfy the search criteria, each of the one or more matches including a person-location data item and an event-location data item from the selected person-location data items and event-location data items;

update the user interface data such that the interactive user interface includes an indication of the one or more matches; and provide a time-based animation of the indication of the one or more matches, wherein:

the interactive user interface includes a map, a slider spanning a period of time associated with the one or more matches, and one or more markers on the map indicating locations associated with the one or more matches, and in response to movement of the slider, markers of the one or more markers that are associated with points in time indicated by a location of the slider are displayed, and markers of the one or more markers that are not associated with points in time indicated by the location of the slider are not displayed.

5. The computing system of claim 4, wherein identifying the one or more matches comprises:
for each combination of pairs of an event-location data item from the plurality of event-location data items and a person-location data item from the plurality of person-location data items:
in response to determining that:
a location associated with the event-location data item is within the distance constraint of a location associated with the person-location data item, and
a time associated with the event-location data item is within the timeframe constraint of a time associated with the person-location data item,
designating the event-location data item and the person-location data item as a match.

6. The computing system of claim 5, wherein the indication of the one or more matches comprises markers on the interactive map.

7. The computing system of claim 5, wherein the indication of the one or more matches comprises information displayed in a force-directed graph including nodes and edges, and wherein:
the nodes represent person-location data items and event-location data items, and
the edges indicate relationships between matched person-location data items and event-location data items that satisfy the search criteria.

8. The computing system of claim 5, wherein the cellular telephone call data includes at least one of: Cell Phone Call Detail Records, Cell Phone Location Detail Records, other types of call records or cell phone location records, GPS Tracker information, or any other timestamped location information associated with a person.

9. The computing system of claim 4, wherein the one or more computer processors are configured to execute the electronic software instructions to further cause the computing system to:
import person-location data received from a third-party source including the cellular telephone call data; and
process the person-location data to determine the plurality of person-location data items including extracting the respective times and locations associated with the person-location data items.

10. The computing system of claim 9, wherein the one or more computer processors are configured to execute the electronic software instructions to further cause the computing system to:
import event-location data received from a third-party source; and
process the event-location data to determine the plurality of event-location data items including extracting the respective times and locations associated with the event-location data items.

11. The computing system of claim 4, wherein the user interface includes first slider configured to receive the distance constraint via user input, and wherein the user interface includes second slider configured to receive the timeframe constraint via user input.

12. A compi1ter-implemented method comprising:
under control of one or more hardware computing devices configured with specific computer executable instructions:
communicating with one or more storage devices configured to store:
a plurality of person-location data items, wherein the person-location data items are associated with respective times and locations, and
wherein the respective times and locations associated with the person-location data items are extracted from cellular telephone call data; and
a plurality of event-location data items associated with one or more unsolved crimes or cold Jaw enforcement cases, and wherein the event-location data items are associated with respective times and locations;
generating user interface data for rendering an interactive user interface on an electronic display, the interactive user interface including an interactive map;
receiving an input from a user of the computing system including search criteria comprising:
a distance constraint,
a timeframe constraint,
a selection of a subset or all of the person-location data, and
a selection of a subset or all of the event-location data; and
in response to the input:
identifying, from the one or more storage devices, one or more matches that satisfy the search criteria, each of the one or more matches including a person-location data item and an event-location data item from the selected person-location data items and event-location data items;
updating the user interface data such that the interactive user interface includes an indication of the one or more matches; and
providing a time-based animation of the indication of the one or more matches,
wherein:
the interactive user interface includes a map, a slider spanning a period of time associated with the one or more matches,
and one or more markers on the map indicating locations associated with the one or more matches, and
in response to movement of the slider, markers of the one or more markers that are associated with points in time indicated by a location of the slider arc displayed, and markers of the one or more markers that are not associated with points in time indicated by the location of the slider are not displayed.

13. The computer-implemented method of claim 12, wherein identifying the one or more matches comprises:
for each combination of pairs of an event-location data item from the plurality of event-location data items and a person-location data item from the plurality of person-location data items:
in response to determining that:
a location associated with the event-location data item is within the distance constraint of a location associated with the person-location data item, and
a time associated with the event-location data item is within the timeframe constraint of a time associated with the person-location data item,
designating the event-location data item and the person-location data item as a match.

14. The computer-implemented method of claim 13, wherein the indication of the one or more matches comprises markers on the interactive map.

15. The computer-implemented method of claim 13, wherein the indication of the one or more matches comprises information displayed in a force-directed graph including nodes and edges, and wherein:

the nodes represent person-location data items and event-location data items, and the edges indicate relationships between matched person-location data items and event-location data items that satisfy the search criteria.

16. The computer-implemented method of claim 12 further comprising:

under control of one or more hardware computing devices configured with specific computer executable instructions:

importing person-location data received from a third-party source including the cellular telephone call data; and processing the person-location data to determine the plurality of person-location data items including extracting the respective times and locations associated with the person-location data items.

17. The computer-implemented method of claim 16 further comprising:

under control of one or more hardware computing devices configured with specific computer executable instructions:

importing event-location data received from a third-party source; and processing the event-location data to determine the plurality of event-location data items including extracting the respective times and locations associated with the event-location data items.

* * * * *

UNITED STATES PATENT AND TRADEMARK OFFICE
CERTIFICATE OF CORRECTION

| | | |
|---|---|---|
| PATENT NO. | : 9,854,397 B1 | Page 1 of 1 |
| APPLICATION NO. | : 15/040263 | |
| DATED | : December 26, 2017 | |
| INVENTOR(S) | : Michael Roy Melson | |

It is certified that error appears in the above-identified patent and that said Letters Patent is hereby corrected as shown below:

In the Claims

In Column 24 at Line 1, In Claim 12, change "compilter-implemented" to --computer-implemented--.

In Column 24 at Line 15 (approx.), In Claim 12, change "Jaw" to --law--.

Signed and Sealed this
First Day of May, 2018

Andrei Iancu
*Director of the United States Patent and Trademark Office*